(12) United States Patent
Wakitani et al.

(10) Patent No.: US 6,734,647 B2
(45) Date of Patent: May 11, 2004

(54) WORKING MACHINE

(75) Inventors: Tsutomu Wakitani, Wako (JP);
Tsutomu Inui, Wako (JP); Hiroo Kanke, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/225,795

(22) Filed: Aug. 22, 2002

(65) Prior Publication Data

US 2003/0080704 A1 May 1, 2003

(30) Foreign Application Priority Data

Oct. 30, 2001 (JP) .................................. 2001-333213
Nov. 28, 2001 (JP) .................................. 2001-362640

(51) Int. Cl.⁷ .............................................. H02P 7/00
(52) U.S. Cl. ......................... 318/432; 318/139; 318/140; 318/430; 318/432; 318/434; 318/55; 318/59; 318/64; 56/10.8; 56/10.2; 56/10.6; 56/11.1; 56/11.9
(58) Field of Search ................................. 318/139, 140, 318/55, 59, 64, 257, 430, 432, 434; 180/65.1–65.3; 290/40, 41, 17; 56/10.6, 10.8, 10.2, 11.1, 11.9

(56) References Cited

U.S. PATENT DOCUMENTS 5,743,347 A * 4/1998 Gingerich ................... 180/65.1
5,973,463 A * 10/1999 Okuda et al. ................ 318/430
6,107,761 A * 8/2000 Seto et al. ................... 318/139
6,215,198 B1 * 4/2001 Inada et al. ................ 290/40 C
6,231,515 B1 * 5/2001 Moore et al. ................ 600/466
6,453,583 B1 * 9/2002 Hanafusa et al. ............. 37/246
6,470,603 B2 * 10/2002 Hanafusa et al. ............. 37/257
6,550,161 B2 * 4/2003 Hanafusa et al. ............. 37/246
6,564,481 B2 * 5/2003 Wakitani et al. ............. 37/348
6,591,593 B1 * 7/2003 Brandon et al. ............. 56/10.6
6,604,348 B2 * 8/2003 Hunt ........................... 56/10.6
2002/0171383 A1 * 11/2002 Hisada et al. ................ 318/432

FOREIGN PATENT DOCUMENTS

JP 03043013 2/1991

* cited by examiner

Primary Examiner—Robert Nappi
Assistant Examiner—Tyrone Smith
(74) Attorney, Agent, or Firm—Adams & Wilks

(57) ABSTRACT

Control section determines necessary acceleration of a transporting section in accordance with an actual transporting speed, and also determines a correction coefficient corresponding to the number of rotations of an engine from among correction coefficients having a characteristic of becoming closer to a value of one as the number of rotations of the engine increases. The control section multiplies the necessary acceleration by the correction coefficient to thereby provide corrected necessary acceleration, and controls rotation of a transporting drive motor in accordance with the corrected necessary acceleration. When the amount of electric power to be generated by a power generator driven by the engine has increased, the control section controls the opening of a throttle valve.

3 Claims, 13 Drawing Sheets

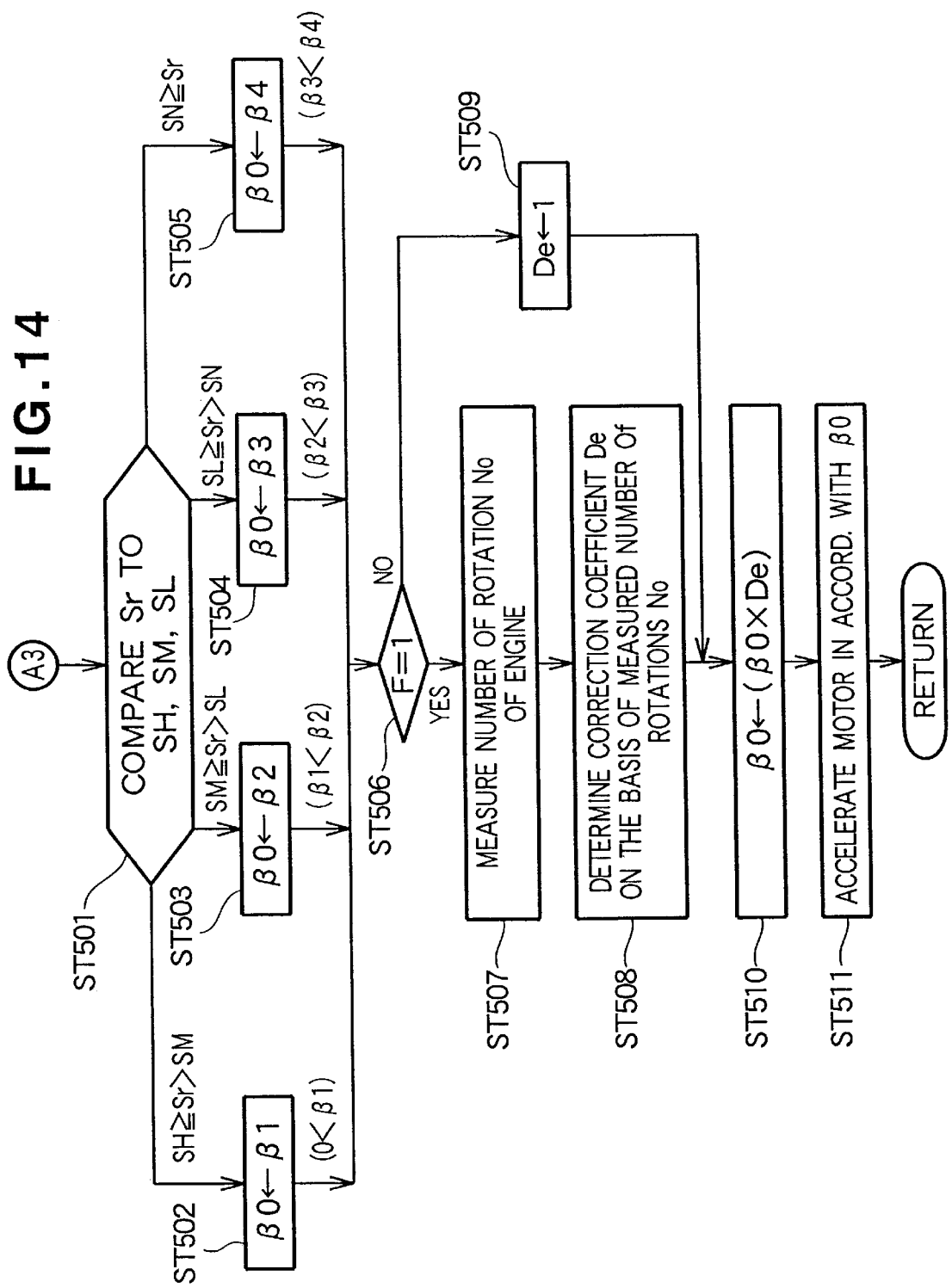

WORKING MACHINE

FIELD OF THE INVENTION

The present invention relates to working machines which include an engine functioning as a drive source of a machine's working section and an electric motor functioning as a drive source of a machine's moving or transporting section.

BACKGROUND OF THE INVENTION

In recent years, there have been developed new-type working machines where a machine's working section and transporting section are driven by separate drive sources. Typically, the working section is driven by an engine, while the transporting section is driven by an electric motor. Because the rotation of the motor that drives the transporting section can be controlled as desired, the new-type working machines can make relatively sharp small turns and thereby move relatively agilely.

Among examples of such new-type working machines is a "self-propelled lawn mower" disclosed in Japanese Patent Laid-open Publication No. HEI-3-43013 (hereinafter also called a "disclosed prior art mower"). In the disclosed prior art mower, a lawn mowing cutter is driven by an engine, front wheels are driven via a transporting drive motor powered by a battery, and the rotation of the transporting drive motor is controlled by a controller.

However, the disclosed prior art mower, where the transporting drive motor is powered by the battery alone, can work only for a limited time. In addition, the battery must be of a great capacity, which therefore has to be large in size and heavy in weight. Mounting such a large and heavy battery on the working machine of a relatively small size is not advisable.

As one solution to the problem of the disclosed prior art mower, it is thinkable to use the above-mentioned engine to drive not only the mowing cutter but also an electric power generator so that the battery can be charged by the power generator, and use the power generator and battery as the power source for the transporting drive motor. In this case, the transporting drive motor can be driven by the power generated by the power generator alone, and the remainder of the power generated by the power generator can be stored in the battery. This way, the battery may have a smaller size, which can advantageously reduce the necessary space for mounting the battery on the mower and the overall weight of the mower as well. In addition, the mower is allowed to work for a very long time.

Generally, a small-size engine is used to drive the mowing cutter or other working section which is subjected to only small loads. However, the working machine is often operated with its traveling speed greatly varied in accordance with actual working conditions. For example, even when the small-size engine is being rotated at low speed with a small throttle opening, the transporting drive motor may be accelerated rapidly to quickly achieve a high-speed transporting state.

Since the transporting drive motor is driven by the electric power generated by the electric power generator at any time, the generator is required to generate more electric power as necessary acceleration of the transporting drive motor increases. As the necessary electric power increases rapidly, the loads on the engine also increase rapidly. If the loads on the engine rapidly become excessive, the number of rotations of the engine would be reduced to a considerable degree. Further, the reduced number of the engine rotations would reduce the number of rotations of the mowing cutter, so that the working efficiency of the mower would be lowered undesirably.

To maintain a desired number of rotations of the engine, it is only necessary to adjust the throttle valve opening by manually operating an engine throttle lever. In this case, however, operating the engine throttle lever each time the transporting drive motor is to be accelerated or decelerated through operation of a transporting speed lever is very bothersome, and some improvement has to be made to enhance the operability of the working machine.

SUMMARY OF THE INVENTION

In view of the foregoing prior art problems, it is an object of the present invention to provide a working machine where a working section and electric power generator are driven via an engine and the power generator and battery chargeable by the power generator are used as power sources of a transporting electric motor, and which can accelerate the electric motor with necessary acceleration while effectively restricting a rapid increase of loads on the engine.

It is another object of the present invention to provide a working machine where a working section and electric power generator are driven via a small-size engine and the power generator is used as a power source of a transporting electric motor, and which can readily maintain a desired number of rotations of the engine in response to acceleration or deceleration of the electric motor and thereby achieve enhanced operability.

It is still another object of the present invention to provide a working machine where a working section and electric power generator are driven via an engine and the power generator is used as a power source of a transporting drive motor, and which can accelerate the electric motor with necessary acceleration while effectively preventing a rapid increase of loads on the engine.

According to a first aspect of the present invention, there is provided an improved working machine which comprises: a driving section including an engine, an electric power generator driven by the engine, a battery chargeable by the electric power generator, and an electric motor (transporting electric motor) drivable by both of the electric power generator and the battery; a working section driven by the engine to perform desired work; a transporting section driven by the electric motor; and a control section for controlling rotation of the electric motor, on the basis of a comparison between an actual transporting speed and a target transporting speed of the transporting section. In the present invention, the control section performs the operations of: determining necessary acceleration of the transporting section in accordance with a current actual transporting speed of the transporting section; determining a correction coefficient corresponding to a current number of rotations of the engine, from among correction coefficients having a characteristic of becoming closer to a value of one as the number of rotations of the engine increases but becoming closer to zero as the number of rotations of the engine decreases; multiplying the necessary acceleration by the determined correction coefficient, to thereby provide corrected necessary acceleration; and controlling the rotation of the electric motor in accordance with the corrected necessary acceleration.

When the number of rotations of the engine is relatively great, i.e., when the engine is rotating at relatively high speed, the rotation of the electric motor can be accelerated in the present invention in accordance with a value close to the necessary acceleration having been determined in accordance with the current actual transporting speed of the transporting section. When, on the other hand, the number of engine rotations is relatively small, the rotation of the electric motor can be accelerated in accordance with the corrected necessary acceleration of a relatively small value. Therefore, the rotation of the electric motor can be accelerated in accordance with optimum necessary acceleration corresponding to the current number of rotations of the engine.

Thus, even when the electric motor has been accelerated rapidly while the engine is rotating at low speed, the acceleration of the motor can be restricted to an optimal value corresponding to the number of rotations of the engine, and thus the amount of power generated by the power generator can also be restricted appropriately. Consequently, loads on the engine can be lessened appropriately. Namely, in the present invention, it is possible to increase the rotating speed of the electric motor with the necessary acceleration while effectively preventing a rapid increase of the loads on the engine. By thus preventing a rapid increase of the loads on the engine, it is possible to avoid an undesired reduction in the number of rotations of the engine, thereby enhancing the operating efficiency of the working section.

According to a second aspect of the present invention, there is provided an improved working machine which comprises: a driving section including an electric motor, an electric power generator, and an engine having a throttle valve associated therewith; a transporting section driven by the electric motor and including a speed lever for setting a target transporting speed of the transporting section to a desired speed value, part or whole of electric power necessary for the electric motor being supplied by the electric power generator; a working section driven by the engine to perform desired work, the electric power generator being driven by the engine; and a control section for controlling rotation of the electric motor so that an actual transporting speed of the transporting section equals the target transporting speed. When the amount of electric power to be generated by the electric power generator has increased in response to a variation or increase in the necessary number of rotations of the electric motor corresponding to an increase in the target transporting speed designated by a human operator, the control section in the present invention controls the opening of the throttle valve, in order to secure the necessary number of rotations of the engine for securing the amount of electric power to be generated.

When the number of rotations of the electric motor is to be increased, more electric power is required, so that the amount of the electric power to be generated by the power generator also has to be increased. To secure the required electric power, it is necessary to acquire more than a predetermined number of rotations of the engine. For this purpose, the present invention is arranged to automatically control the opening of the throttle valve by means of the control section. With such arrangements, the present invention can readily maintain the necessary number of rotations of the engine, and eliminate the need for manipulating an engine throttle lever each time the electric motor is to be accelerated or decelerated by manipulation of the speed lever. As a consequence, the operability of the working machine of the invention can be enhanced to a significant degree.

Further, when the number of rotations of the electric motor is reduced and thus the power generator only has to generate a less amount of electric power, the load on the engine can be lessened accordingly, so that the engine does not have to operate at high speed. Therefore, the control section in the present invention automatically reduces the opening of the throttle valve. Because, in this case, the engine does not have to continue operating at high speed unnecessarily, it is possible to not only save the fuel and but also prolong the life of the engine. In addition, the present invention can effectively prevent the number of rotations of the engine from being undesirably reduced due to a great load imposed on the engine when a great amount of electric power has to be secured, with the result that the operating efficiency of the working machine can be enhanced to a significant degree.

According to the second aspect of the present invention, the control section preferably performs the operations of: determining necessary acceleration in accordance with a current actual transporting speed of the transporting section; when the opening of the throttle valve has reached a predetermined upper limit opening value, determining a correction coefficient corresponding to a current number of rotations of the engine from among correction coefficients having a characteristic of becoming closer to a value of one as the number of rotations of the engine increases and becoming closer to zero as the number of rotations of the engine decreases; when the opening of the throttle valve has not yet reached the upper limit opening value, setting the correction coefficient at the value of one; multiplying the necessary acceleration by the correction coefficient, to thereby provide corrected necessary acceleration; and controlling the rotation of the electric motor in accordance with the corrected necessary acceleration.

When the necessary number of rotations of the electric motor has increased, the control section automatically increases the opening of the throttle valve as long as the engine still has sufficient room or capacity to produce higher outputs, in order to supply necessary electric power corresponding to the increase in the number of rotations. As a consequence, the rotation of the electric motor can be accelerated in accordance with a value close to the necessary acceleration determined in correspondence with the current actual transporting speed of the transporting section.

When, on the other hand, the opening of the throttle valve has reached the upper limit opening value and the engine no longer has sufficient room or capacity to produce higher outputs, the rotation of the electric motor is accelerated in accordance with the corrected necessary acceleration of a relatively small value. Thus, the rotation of the motor can be controlled with optimal acceleration corresponding to the number of rotations of the engine. By the acceleration of the motor being thus restricted to an optimal acceleration value corresponding to the number of rotations of the engine, the amount of power generated by the electric power generator can also be restricted appropriately. Consequently, the loads on the engine can be lessened appropriately. Namely, in the present invention, it is possible to increase the rotating speed of the motor with the necessary acceleration while effectively preventing a rapid increase of the loads on the engine. By thus preventing a rapid increase of the loads on the engine, it is possible to avoid an undesired reduction in the number of rotations of the engine, thereby enhancing the operating efficiency of the working section

BRIEF DESCRIPTION OF THE DRAWINGS

Certain preferred embodiments of the present invention will hereinafter be described in detail, by way of example only, with reference to the accompanying drawings, in which:

FIG. 14 is a flow chart showing still another portion of the engine/motor control processing.

DETAILED DESCRIPTION OF THE PREFERRED EMBODIMENTS

Figure 1:
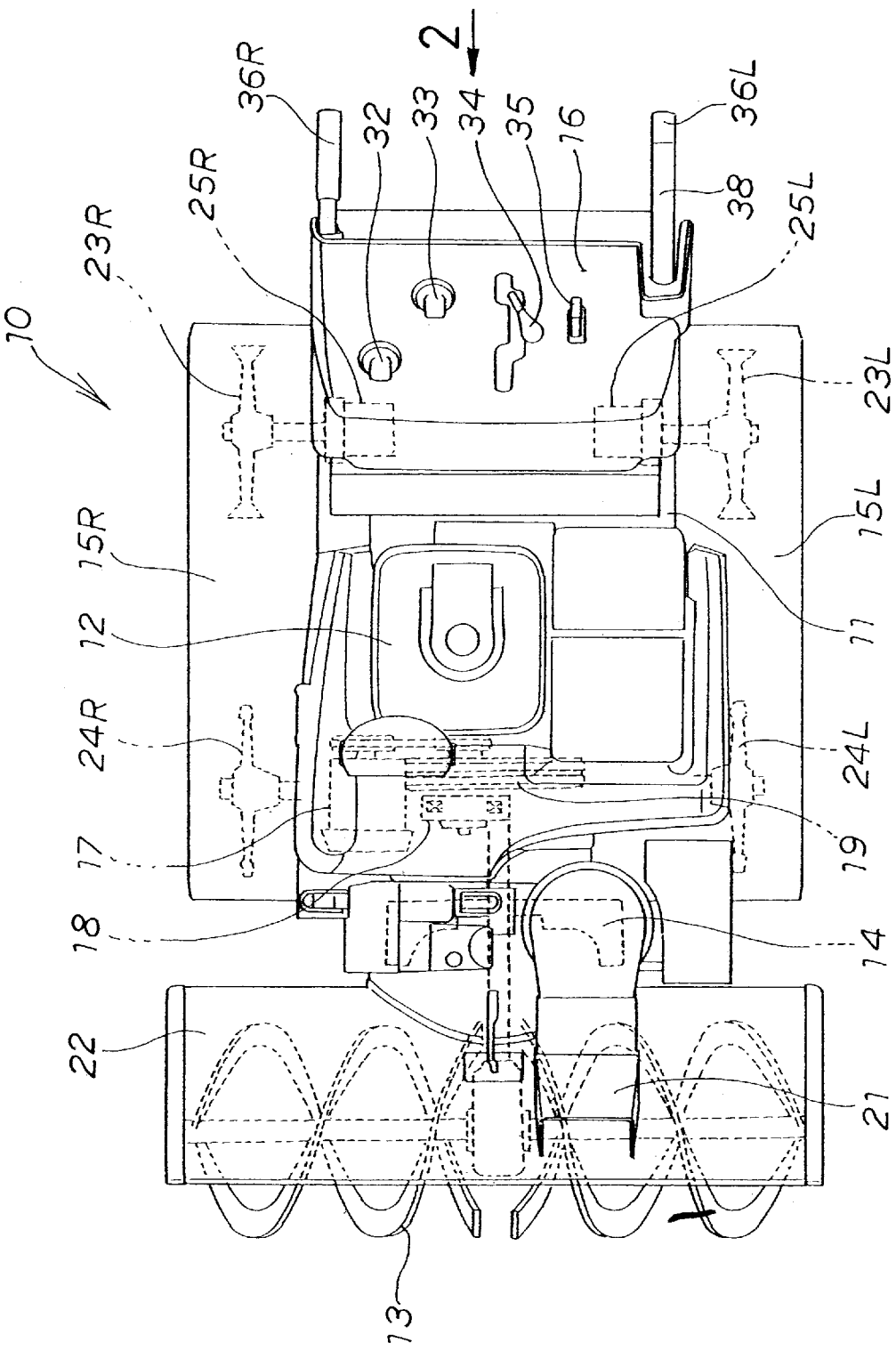
FIG. 1 is a plan view of a snow removing machine in accordance with a first embodiment of the present invention.

It should be noted that the terms "front", "rear", "left", "right", "upper", "lower", etc. represent directions as viewed by a human operator of a working machine of the present invention to be detailed hereinbelow, and that letters "L" and "R" attached to some reference numerals represent left and right sides of the working machine.

FIG. 1 is a plan view of the working machine in accordance with a first embodiment of the present invention, which is embodied as a snow removing machine 10 in the form of an electromotive vehicle. The snow removing machine 10 includes a machine body 11, an engine 12 mounted on the body 11, a working section mounted at a front portion of the body 11 and including an auger 13 and blower 14, crawlers 15L and 15R mounted on left and right sides of the body 11, and an operation panel 16 mounted at a rear portion of the body 11. The snow removing machine 10 is a walking-type working machine that is operated by a human operator behind the operation panel 16. Details of the operation panel 16 will be described in relation to FIG. 2.

Further, in the snow removing machine 10 of FIG. 1, an electric power generator 17 is driven by a portion of the output of the engine 12, and electric power generated by the power generator 17 is supplied to both a battery 43 (FIG. 4) disposed under the operation panel 16 and left and right electric motors (i.e., transporting drive motors) 25L and 15R to be later described. The engine 12, electric power generator 17, battery 43 and electric motors 25L and 15R together constitute a driving section of the snow removing machine 10.

The remaining portion of the output of the engine 12 is supplied via an electromagnetic clutch 18 and belt 19 to the working section so that the auger 13 and blower 14, constituting the working section (denoted at 45 in FIG. 4), can be rotated or driven by the remaining portion of the engine output. Namely, the power generator 17 is driven by the same small-size engine 12 that drives the working section (auger 13 and blower 14) subjected to relatively small loads. The auger 13 functions to gather snow accumulated on the ground toward the middle of the machine 10, and the blower 14 receives and projects the thus-gathered snow to desired positions around the machine body 11 via a chute 21. The auger 13 is partly covered with an auger housing 22.

The left crawler 15L is wound on a driving wheel 23L and idler wheel 24L; in the instant embodiment of the invention, the driving wheel 23L can be rotated in forward and reverse directions via the left transporting drive motor 25L. Similarly, the right crawler 15R is wound on a driving wheel 23R and idler wheel 24R, and the driving wheel 23R can be rotated in forward and reverse directions via the right transporting drive motor 25R.

In contrast to the traditional snow removing machines where both the working section (i.e., auger-rotating section) and the transporting section (i.e., crawler-driving section) are driven by a single gasoline (petrol) engine or diesel engine, the snow removing machine 10 of the present invention is designed to drive the working section (i.e., auger-rotating section) by means of the engine 12 and drive the transporting section (i.e., crawler-driving section) by means of the electric motors (transporting drive motors) 25L and 25R. Such a driving scheme is employed in the present invention on the ground that the transporting speed, turning movements and switching between forward and rearward travel of the machine 10 can be suitably controlled finely by the electric motors while the working section subjected to rapid load variations can be suitably driven by the powerful inner-combustion engine.

Figure 2:
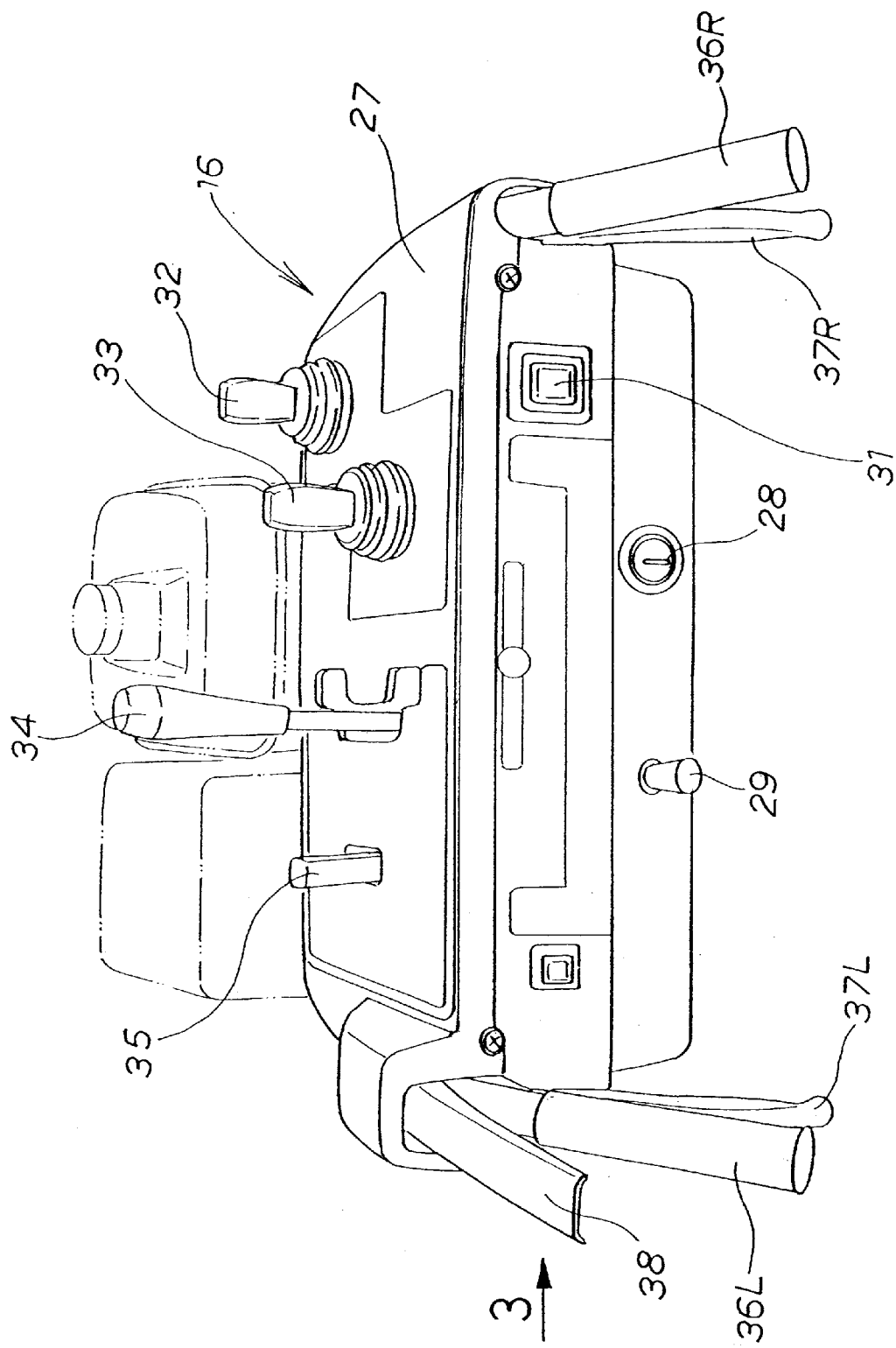
FIG. 2 is a view of the snow removing machine taken in a direction of arrow "2" of FIG. 1.

FIG. 2 is a view of the snow removing machine 10 taken in a direction of arrow "2" of FIG. 1. The operation panel 16 includes, on its surface right behind the rear end of an operation box 27, a main switch 28, an engine choke 29, a clutch operating button 31, etc. The operation panel 16 also includes, on the upper surface of the operation box 27, a snow-projecting-direction adjusting lever 32, an auger-housing-position adjusting lever 33, a direction/speed control lever 34 associated with the transporting section, and an engine throttle lever 35 associated with the working section. Further, a right grip 36R and right-turning operation lever 37R are provided to the right of the operation box 27, and a left grip 36R and left-turning operation lever 37L and travel-standby lever 38 are provided to the left of the operation box 27.

The left-turning and right-turning operation levers 37L and 37R are similar to brake levers, but, unlike the brake levers, they can not perform complete braking. These levers 37L and 37R are each operable to reduce the rotating speed of the corresponding transporting drive motor 25L or 25R to turn the machine body 11 to the left or right. This is why the levers 37L and 37R are named "left-turning and right-turning operation levers" instead of brake levers.

The main switch 28 is a well-known type of switch for insertion therein of a main key so that the engine 12 can be activated by turning, in a predetermined direction, of the inserted main key. Pulling the engine choke 29 toward the human operator can increase the concentration of an air/fuel mixture in the engine 12. The snow-projecting-direction adjusting lever 32 is operable to change the operated direction of the chute 21 (FIG. 1), and the auger-housing-position adjusting lever 33 is operable to change the position of the auger housing 32 (FIG. 1).

Figure 3:
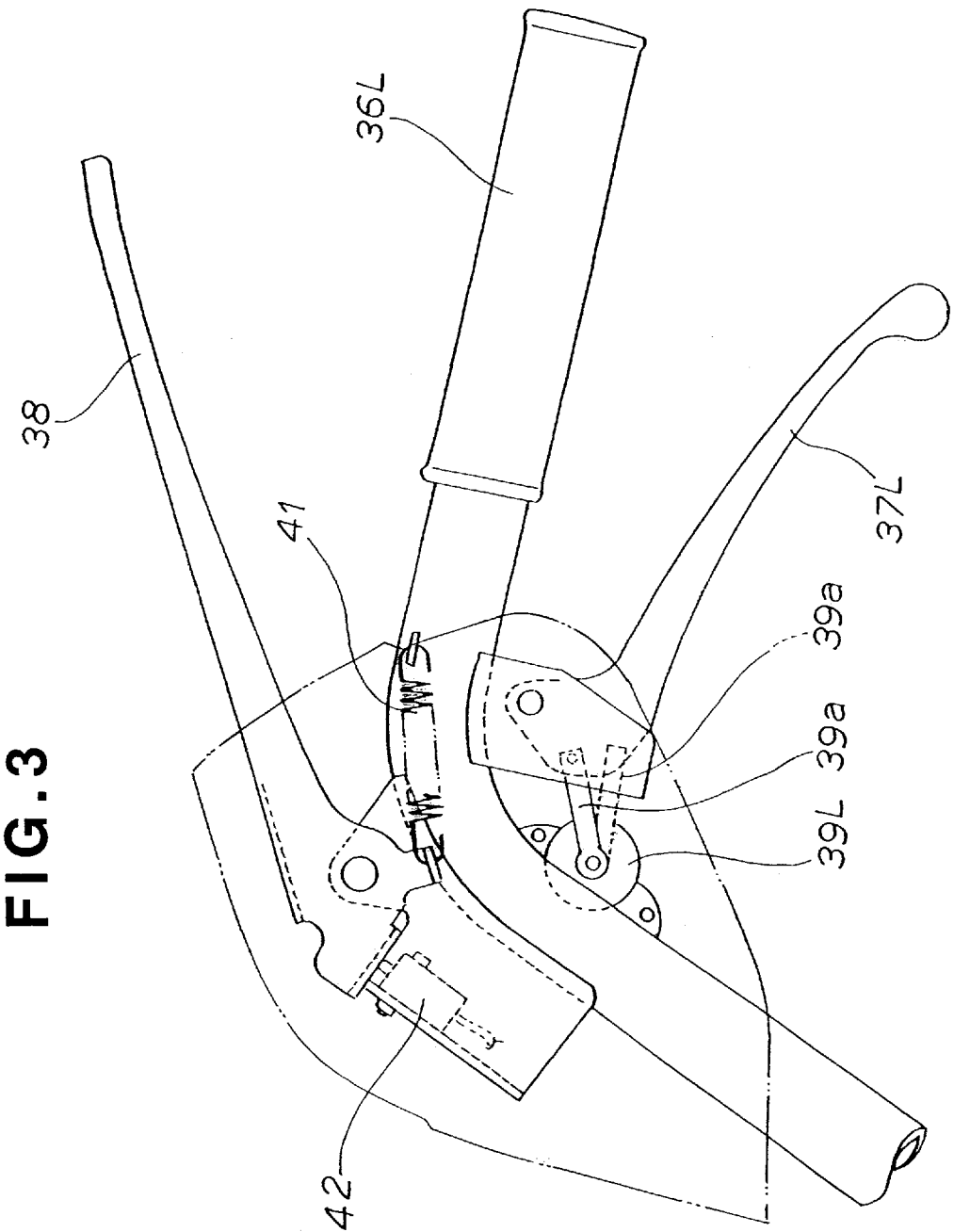
FIG. 3 is a view taken in a direction of arrow "3" of FIG. 2.

FIG. 3 is a view taken in a direction of arrow "3" of FIG. 2. The human operator can cause an arm 39a of a potentiometer 39L to pivot downwardly to a position denoted by a phantom (dot-and-dash) line, by gripping the left-turning operation lever 37L together with the grip 36L. The potentiometer 39L generates an electric signal corresponding to a current rotational position of the arm 39a.

Further, the travel-standby lever 38 is provided for turning on/off a switch 42. Namely, the switch 42 is kept in an ON state as long as the travel-standby lever 38 is held in a free or released position, as shown in FIG. 3, by a tension force of a spring 41. The switch 42 is turned off as the travel-standby lever 38 is caused to pivot downwardly (clockwise in FIG. 3) with the left hand of the human operator. Thus, whether or not the travel-standby lever 38 is being gripped together with the grip 36L can be detected via the switch 42.

Figure 4:
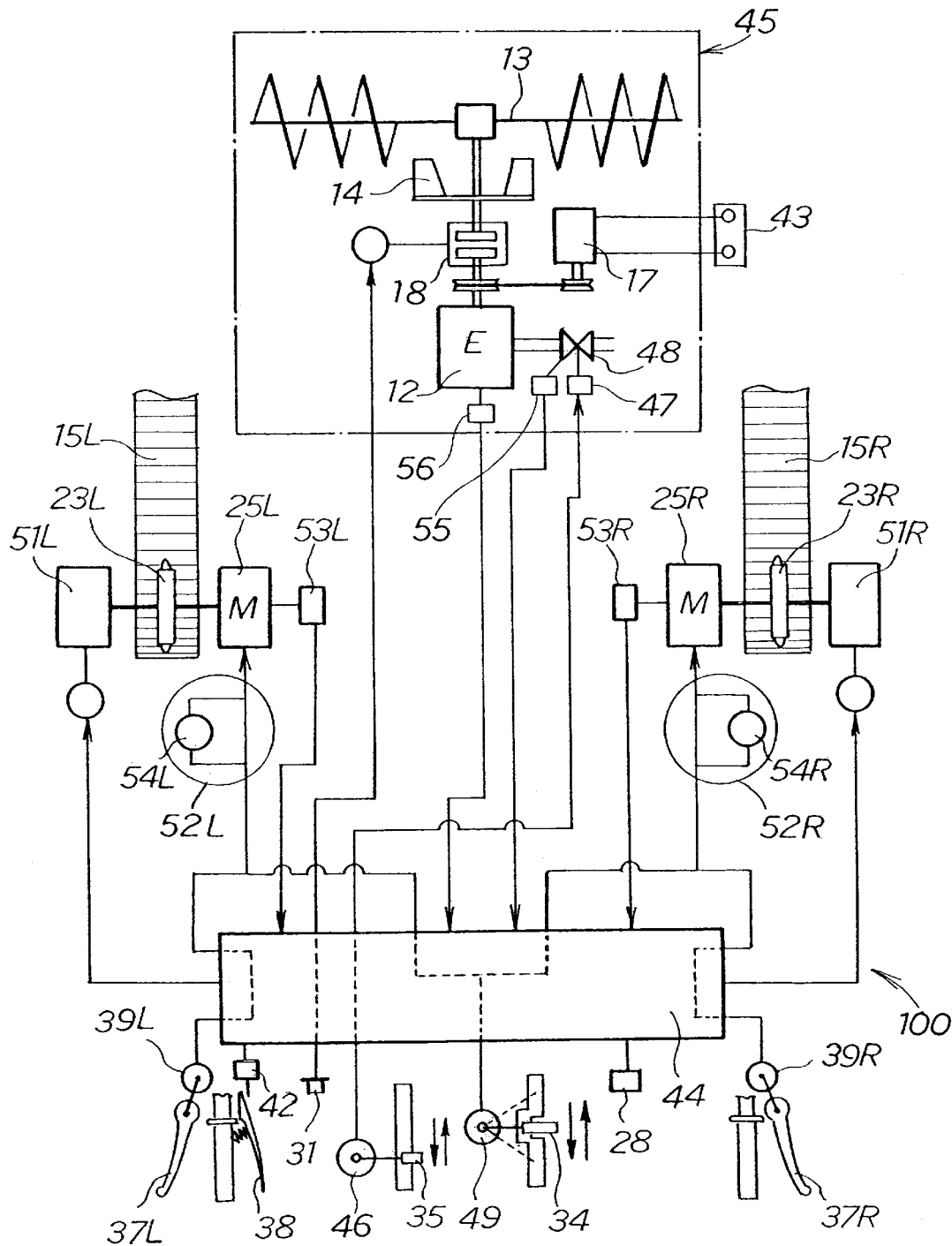
FIG. 4 is a diagram illustrating a general control system of the snow removing machine.

FIG. 4 is a diagram illustrating a general control system of the snow removing machine 10, of which a control section 44 is incorporated in or attached to the operation panel 16. Generally, in the figure, square blocks represent various components of the control section 44 while circular blocks represent drivers. The engine 12, electromagnetic clutch 18, blower 14 and auger 13, enclosed by a phantom-line (in this case, dash-and-dot line) block, together constitute the working section 45, and the remaining components constitute the transporting section 100. Reference numeral 43 represents the battery. Further, in the figure, flows of various instructions passed in the control section 44 are indicated by dotted lines, although they are just for reference purposes.

The working section 45 in the instant embodiment operates as follows. The human operator inserts the main key in the main switch 28 and turns the inserted key to a start position, so that the engine 12 is activated through rotation of a self starter motor (not shown).

The engine throttle lever 35 is operatively connected via a not-shown throttle wire to the throttle valve 48, and thus the opening of the throttle valve 48 can be controlled by the human operator operating the engine throttle lever 35. In this way, the number of rotations of the engine 12 can be controlled as desired.

The engine throttle lever 35 can be moved back and form in a reciprocative fashion by one of the human operator's hands, and a potentiometer 46 produces a voltage corresponding to a current position (i.e., position information) of the throttle lever 35. The control section 44, which receives the position information of the engine throttle lever 35 from the potentiometer 46, controls the opening of the throttle valve 48 via a throttle actuator 47. The current opening of the throttle valve 48 is detected by a throttle opening sensor 55, and the control section 44 performs feedback control, on the basis of a detection signal output from the throttle opening sensor 55, so as to achieve a predetermined opening of the throttle valve 48. As a consequence, the number of rotations of the engine 12, which is detected via an engine rotation sensor 56, can be controlled by the control section 44. In practice, the control section 44 controls the opening of the throttle valve 48 on the basis of other detection signals as well as the output signal of the throttle opening sensor 55.

Further, by gripping the travel-standby lever 38 together with the left grip 36L and activating the clutch operating button 31, the human operator can bring the electromagnetic clutch 18 to a connected state, so as to rotate the blower 14 and auger 13. The human operator can bring the electromagnetic clutch 18 to a disconnected state by either releasing the travel-standby lever 38 or manipulating the clutch operating button 31 in a predetermined manner.

The transporting section in the instant embodiment operates as follows. The snow removing machine 10 of the present invention includes left and right electromagnetic brakes 51L and 51R that correspond in function to parking brakes of an ordinary motor vehicle. During parking, these electromagnetic brakes 51L and 51R are held in a braking state under the control of the control section 44. The electromagnetic brakes 51L and 51R are released in the following operation sequence.

Once the direction/speed lever 34 is shifted to an "advance" or "retreat" region (FIG. 5) while the main switch 28 is in the start position and the travel-standby lever 38 is being gripped together with the left grip 36L, the electromagnetic brakes 51L and 51R are brought to a released (non-braking) state.

Figure 5:
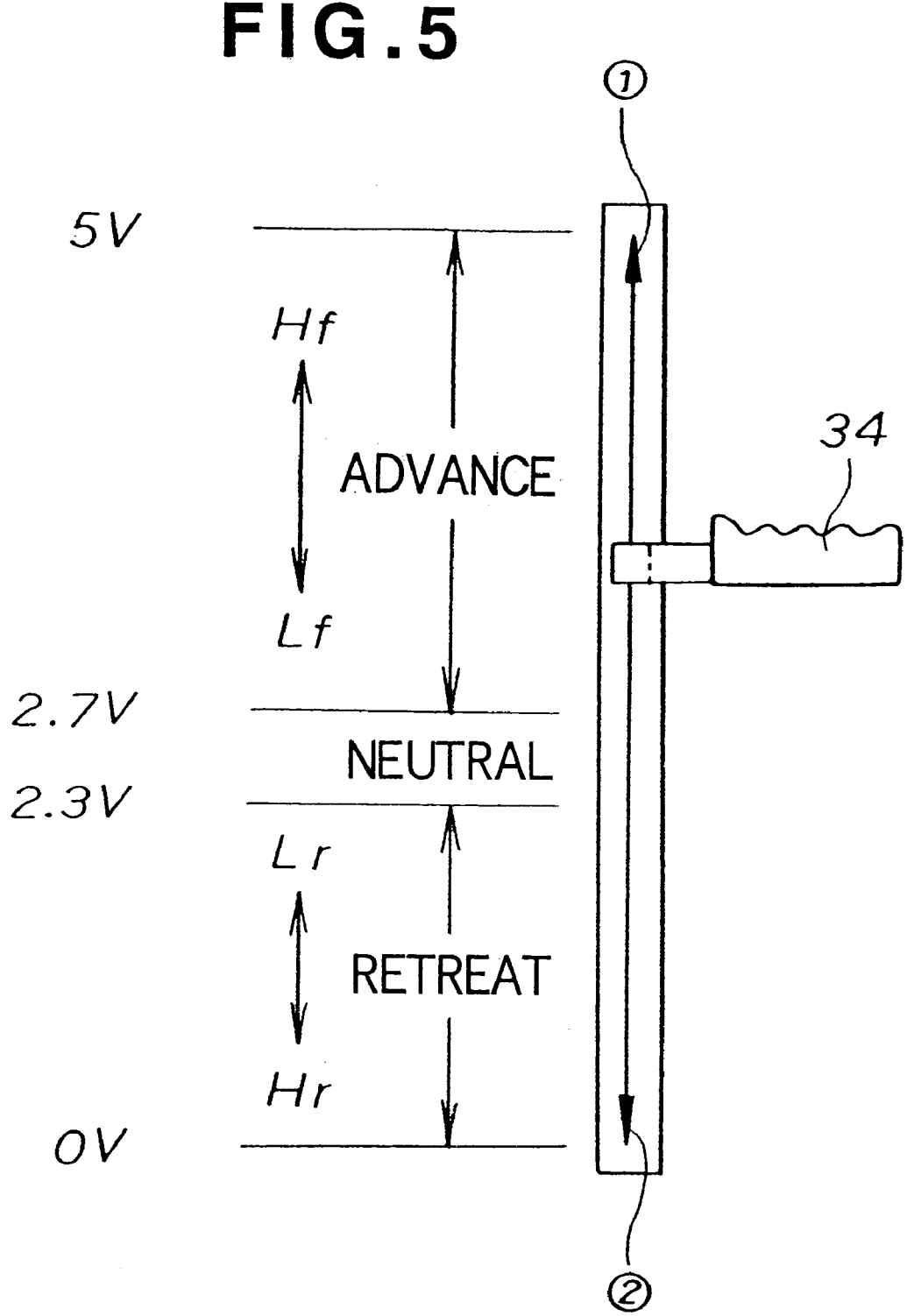
FIG. 5 is a view explanatory of operation of a direction/speed lever employed in the snow removing machine of the invention.

FIG. 5 is a view explanatory of operation of the direction/speed lever 34 employed in the present invention. The direction/speed lever 34 can be moved reciprocatively as denoted by arrow ① and arrow ②. Turning the direction/speed lever 34 to the "advance" region beyond a "neutral region" can advance or transport forward the vehicle 10. In the "advance" region, the traveling speed of the vehicle 10 can be controlled between a low advance speed Lf and a high advance speed Hf. Further, turning the direction/speed lever 34 to the "retreat" region beyond the "neutral region" can retreat or transport rearward (i.e., back up) the vehicle 10. In the "retreat" region, the traveling speed of the vehicle 10 can be controlled between a low retreat speed Lr and high retreat speed Hr. In this embodiment, the potentiometer generates a voltage corresponding to a current position (i.e., position information) of the direction/speed lever 34; for example, a potentiometer 49 generates 0 volt (V) when the direction/speed lever 34 is at the highest-retreat-speed position, 5 V when the lever 34 is at the highest-advance-speed position, and 2.3 V–2.7 V when the lever 34 is in the neutral region. The direction/speed lever 34 is so named because it can set both a forward or rearward traveling direction and a traveling speed of the vehicle 10.

Referring back to FIG. 4, the control section 44, which receives, from the potentiometer 49, the position information of the direction/speed lever 34, rotates the left and right transporting drive motors 25L and 25R via left and right motor drivers 52L and 52R, detects respective rotating speeds of the drive motors 25L and 25R via corresponding rotation sensors 53L and 53R, and then performs feedback control of the drive motors 25L and 25R, on the basis of rotation detection signals output from the rotation sensors 53L and 53R, so that the respective rotating speeds of the motors 25L and 25R take on predetermined speed values. As a consequence, the left and right driving wheels 23L and 23R can be rotated at a desired speed in a desired direction, so that the vehicle 10 can travel at a desired speed in the desired direction.

During the travel of the vehicle 10, the vehicle 10 is braked in the following manner. In the instant embodiment, the motor drivers 52L and 52R include regenerative brake circuits 54L and 54R, respectively.

Generally speaking, the electric motor can be rotated by electric energy supplied thereto from a battery. The electric power generator, on the other hand, is a means for converting rotational force into electric energy. The present invention therefore uses an electrical switching scheme to allow the transporting drive motors 25L and 25R to also function as electric power generators for generating necessary electric power. If the voltage of the power thus generated by the drive motors 25L and 25R is greater than the battery voltage, then the generated electric energy can be stored in the battery 43. This arrangement is based on the operating principle of the regenerative brake.

Gripping intensity with which the left-turning operation lever 37L is gripped by the human operator is detected by the potentiometer 39L, and the control section 44 actuates the left regenerative brake circuit 54L, in accordance with a detection signal output from the potentiometer 39L, to thereby reduce the rotating speed of the left transporting drive motor 25L. Similarly, gripping intensity with which the right-turning operation lever 37R is gripped by the human operator is detected by the potentiometer 39R, and the control section 44 actuates the right regenerative brake circuit 54R, in accordance with a detection signal output from the potentiometer 39R, to thereby reduce the rotating speed of the right transporting drive motor 25R.

Thus, in the instant embodiment, the human operator can turn the vehicle 10 leftward by gripping the left-turning operation lever 37L and turn the vehicle 10 rightward by gripping the right-turning operation lever 37R.

The travel of the vehicle 10 can be terminated in any one of the following three ways:

1) by returning the direction/speed lever 34 to the neutral region;
2) by releasing the travel-standby lever 38; and
3) by returning the main switch 28 to an OFF position.

As the main switch 28 is returned to the OFF position after the termination of the travel of the vehicle 10, the electromagnetic brakes 51L and 51R are brought to the braking state, which will achieve the same effect as when the parking brake is put on in an ordinary motor vehicle.

Now, with reference to FIGS. 6 to 10, a detailed description will be given about control processing performed by the control section 44 of FIG. 4 in the case where the control section 44 is implemented by a microcomputer.

Figure 6:
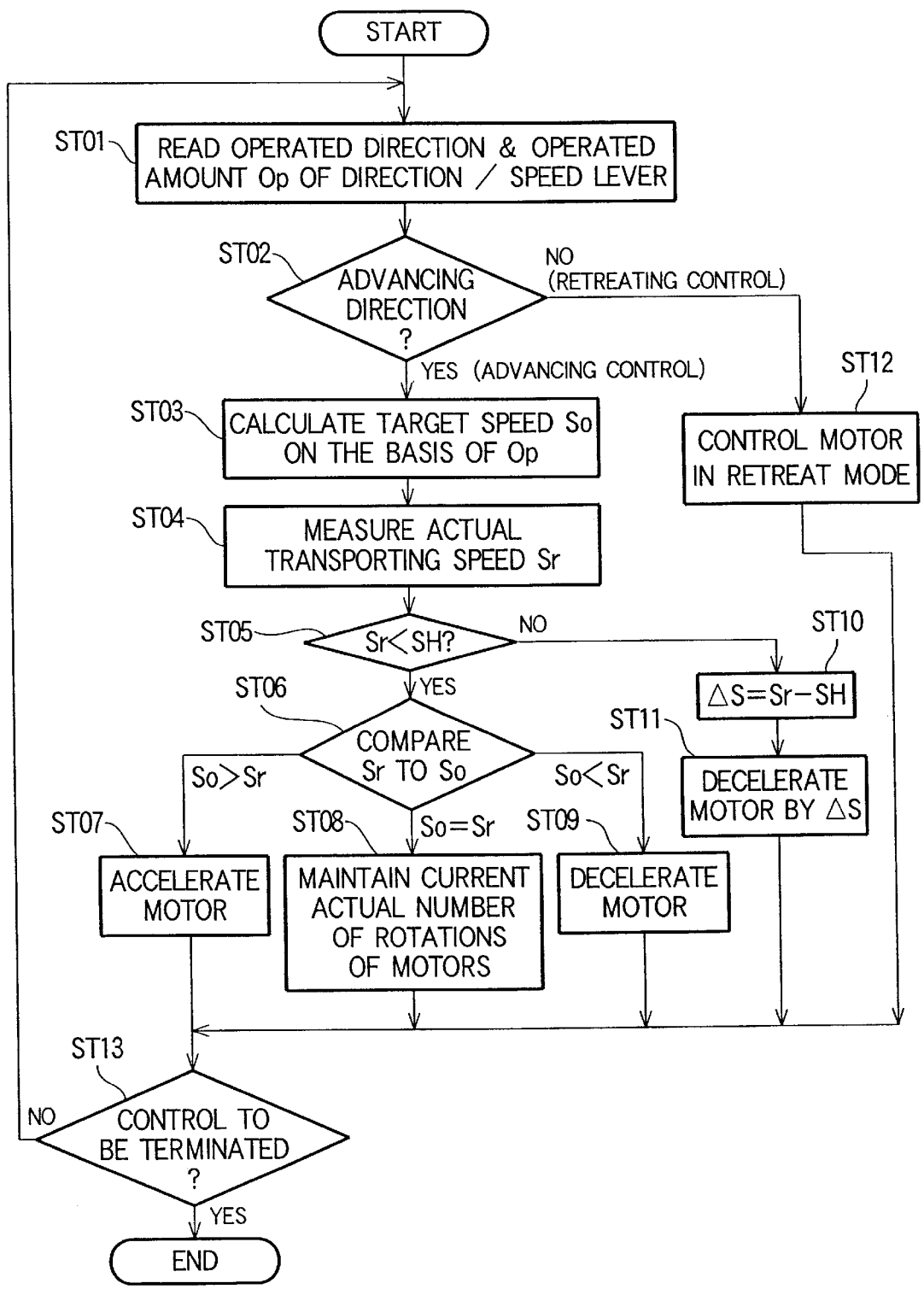
FIG. 6 is a flow chart showing an exemplary step sequence of transporting-drive-motor control processing performed by a control section of FIG. 4.

FIG. 6 is a flowchart showing an exemplary step sequence of transporting-drive-motor control processing performed in the first embodiment by the control section 44 of FIG. 4, which is started up, for example, in response to turning-on of the main switch 28. The steps in the transporting-drive-motor control processing are arranged as follows.

Step ST01: The control section 44 reads a current operated direction and amount Op of the direction/speed lever 34; note that the operated direction and operated amount Op are determined by a current position of the direction/speed lever 34.

Step ST02: It is determined whether or not the current operated direction of the direction/speed lever 34 is the direction for advancing the vehicle 10 (i.e., advancing direction). With an affirmative (YES) determination, the control section 44 moves on to step ST03, where the left and right electric motors (transporting drive motors) 25L and 25R are subjected to advancing control in a predetermined advance mode. With a negative (NO) determination, the control section 44 branches to step ST12.

Step ST03: On the basis of the operated amount Op of the direction/speed lever 34, the control section 44 calculates a target speed So of the transporting section to be advanced or transported forward. The target speed So is, for example, a target number of rotations of the electric motors 25L and 25R.

Step ST04: Current actual transporting speed Sr of the transporting section is measured; for example, the actual transporting speed Sr may be measured by measuring the actual number of rotations of the motors 25L and 25R via the rotation sensors 53L and 53R of FIG. 4.

Step ST05: Determination is made as to whether the actual transporting speed Sr is lower than a predetermined upper threshold (upper limit) value SH. If answered in the affirmative, the control section 44 proceeds to step ST06, but if answered in the negative, the control section 44 judges the actual transporting speed Sr to be excessive and branches to step ST10.

Step ST06: The actual transporting speed Sr is compared to the target speed So. If the actual transporting speed Sr is lower than the target speed So, the control section 44 judges the actual transporting speed Sr to be insufficient and goes to step ST107. If the actual transporting speed Sr is equal to the target speed So, the control section 44 judges that there is currently no need to change the vehicle's traveling state and thus moves on to step ST08. Further, if the actual transporting speed Sr is greater than the target speed So, the control section 44 judges the actual transporting speed Sr to be excessive and branches to step ST09.

Step ST07: To eliminate the shortage of the speed, the electric motors 25L and 25R are subjected to accelerating control in a predetermined acceleration mode, and then the control section 44 goes to step ST13.

Step ST08: Because there is currently no need to change the vehicle's traveling state, the control section 44 goes to step ST13 while maintaining the current actual number of rotations of the transporting drive motors 25L and 25R.

Step ST09: To eliminate the excess of the speed, the electric motors 25L and 25R are subjected to decelerating control in a predetermined deceleration mode, and then the control section 44 goes to step ST13.

Step ST10: Speed difference ΔS between the actual transporting speed Sr and the upper threshold value SH is calculated to determine an exact amount of the excess of the actual transporting speed Sr.

Step ST11: The electric motors 25L and 25R are decelerated by an amount corresponding to the calculated speed difference ΔS so that the transporting speed is returned to the upper threshold value SH, and then the control section 44 goes to step ST13. The operations of steps ST03 to ST11 above constitute the advancing control in the instant embodiment.

Step ST12: This step is taken when it has been determined at step ST02 that the current operated direction of the direction/speed lever 34 is the retreating direction. The electric motors 25L and 25R are subjected to retreating control in a predetermined retreat mode. Note that this retreating control is substantially similar to the advancing control of steps ST03 to ST11, except that the retreating control is intended to control backward travel, rather than forward travel, of the vehicle 10.

Step ST13: Determination is made as to whether or not the control processing of FIG. 6 is to be brought to an end. With an affirmative determination, the control section 44 terminates the control, while with a negative determination, the control section 44 loops back to step ST01. For example, the control processing of FIG. 6 is terminated when the main switch 28 has been turned off.

Figure 7:
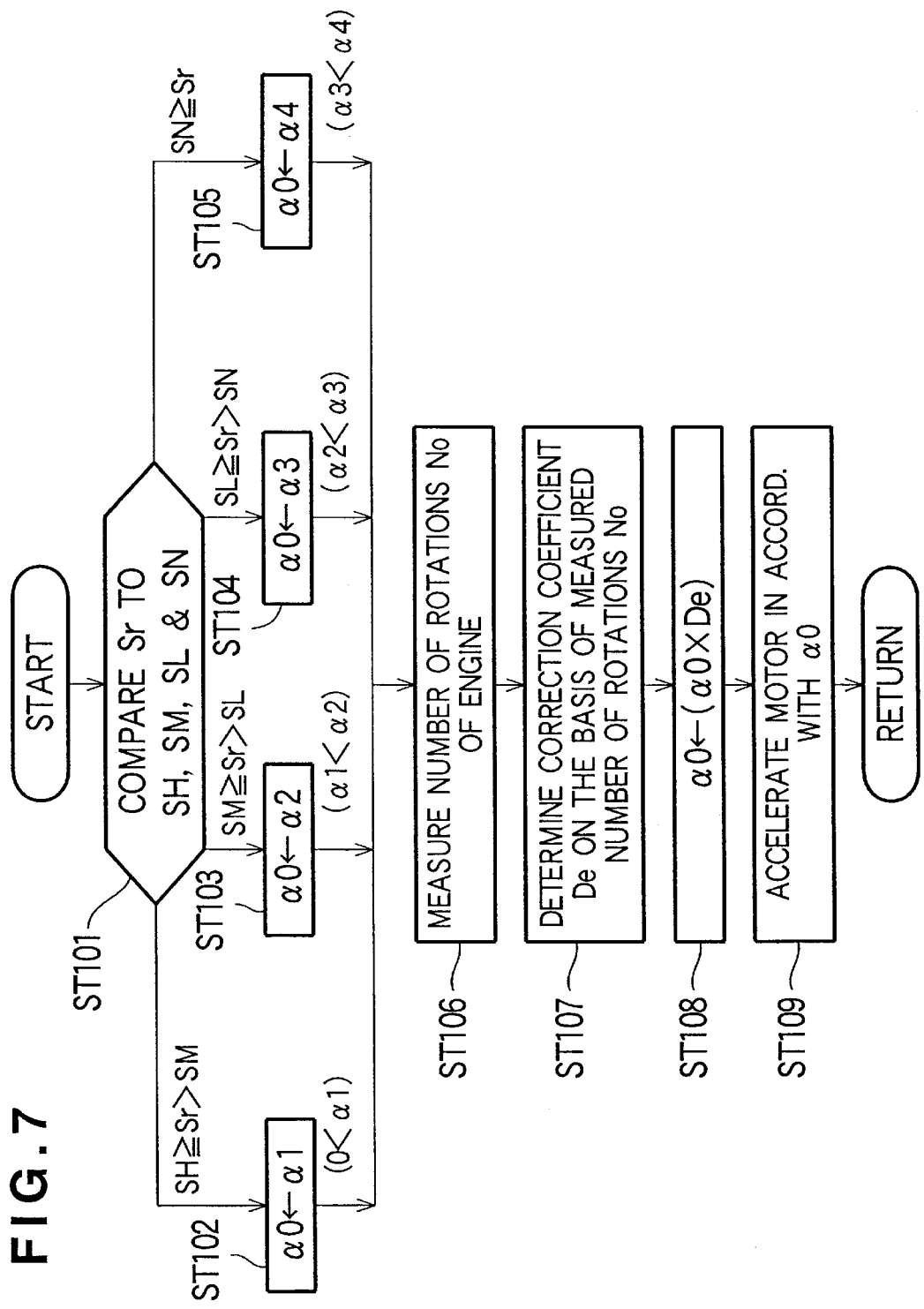
FIG. 7 is a flow chart showing accelerating control that is performed by the control section at step ST07 of FIG. 6.

FIG. 7 is a flowchart showing an exemplary step sequence of the accelerating control that is performed by the control section 44 at step ST07 of FIG. 6. The steps in the accelerating control subroutine are carried out as follows.

Step ST101: The actual transporting speed Sr is compared to several predetermined speed-related threshold values, i.e. high-speed threshold value SH, medium-speed threshold value SM, low-speed threshold value SL and minute-speed threshold value SN; relationship among these threshold values is "SH>SM>SL>SN". Let it be assumed here that the high-speed threshold value SH is 4.0 km/h, the medium-speed threshold value SM 3.0 km/h, the low-speed threshold value SL 1.5 km/h and the minute-speed threshold value SN is 0.5 km/h. If the comparison result of step ST101 shows that the actual transporting speed Sr is higher than the medium-speed threshold value SM but not higher than the high-speed threshold value SH (i.e., SH≧Sr>SM), the control section 44 judges that the actual transporting speed Sr is in a high speed region and goes to step ST102. If the actual transporting speed Sr is higher than the low-speed threshold value SL but not higher than the medium-speed threshold value SM (SM≧Sr>SL), the control section 44 judges that the actual transporting speed Sr is in a medium speed region and goes to step ST103. If the actual transporting speed Sr is higher than the minute-speed threshold value SN but not higher than the low-speed threshold value SL (SL≧Sr>SN), the control section 44 judges that the actual transporting speed Sr is in a low speed region and goes to step ST104. Further, if the actual transporting speed Sr is equal to or lower than the minute-speed threshold value SN (SN≧Sr), the control section 44 judges that the actual transporting speed Sr is in a minute speed region and goes to step ST105.

Step ST102: First reference acceleration $\alpha 1$, which is for example 0.8 m/s$^2$, is set as acceleration $\alpha 0$ necessary for the accelerating control (i.e., necessary acceleration $\alpha 0$) of the transporting drive motors 25L and 25R.

Step ST103: Second reference acceleration $\alpha 2$ greater than the first reference acceleration $\alpha 1$, which is for example 0.9 m/s$^2$, is set as the necessary acceleration $\alpha 0$.

Step ST104: Third reference acceleration $\alpha 3$ greater than the second reference acceleration $\alpha 2$, which is for example 1.0 m/s$^2$, is set as the necessary acceleration $\alpha 0$.

Step ST105: Fourth reference acceleration $\alpha 4$ greater than the third reference acceleration $\alpha 2$, which is for example 1.4 m/s$^2$, is set as the necessary acceleration $\alpha 0$.

As apparent from the foregoing, the operations of steps ST101 to ST105 above are each directed to determining the necessary acceleration $\alpha 0$ in accordance with the actual transporting speed Sr of the transporting section.

Step ST106: The number of rotations No of the engine 12 is measured. The number of rotations No of the engine 12 may be measured via the rotation sensor 56.

Step ST107: Correction coefficient De is determined on the basis of the number of rotations No of the engine 12. Specifically, the correction coefficient De is determined in the embodiment with reference to a map of FIG. 8.

Figure 8:
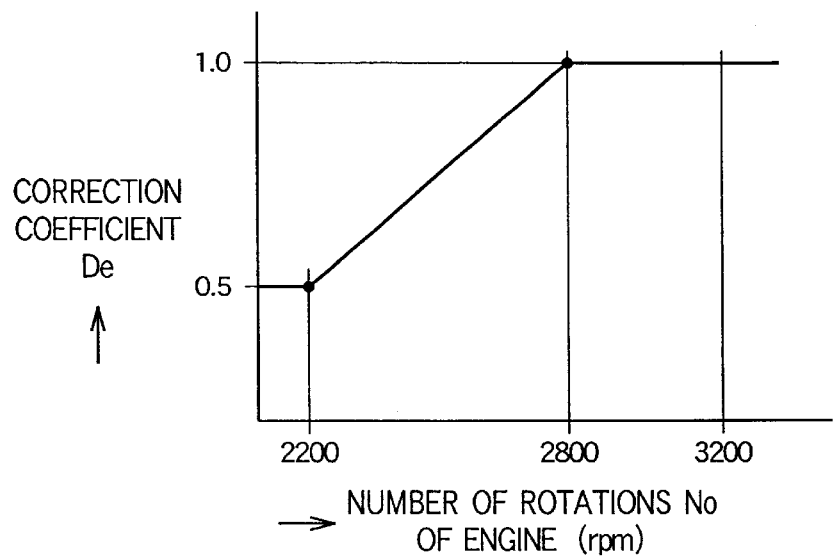
FIG. 8 is a correction coefficient map employed in the snow removing machine of the present invention.

FIG. 8 shows a correction coefficient map employed in the embodiment of the present invention, where the horizontal axis represents the number of rotations No of the engine 12 while the vertical axis represents the correction coefficient De. This correction coefficient map is used to obtain a particular value of the correction coefficient De corresponding to a current measure of the number of rotations No of the engine 12.

From the correction coefficient map illustrated in FIG. 8, it can be seen that the correction coefficient De becomes closer to a value "1" as the number of rotations No of the engine 12 increases and becomes closer to a value "0" as the number of rotations No of the engine 12 decreases. More specifically, the correction coefficient De is set to "0.5" when the number of rotations No of the engine 12 is below a normal lower limit value of 2,200 rpm, set to "1.0" when the number of rotations No of the engine 12 is above a normal upper limit value of 2,800 rpm, and set to values represented by a linear line when the number of rotations No of the engine 12 is within the range of 2,200 to 2,800 rpm. With such a correction coefficient map, it is possible to obtain a value of the correction coefficient De corresponding to the current measure of the number of rotations No of the engine 12.

As clear from the foregoing, step ST107 of FIG. 7 is directed to obtaining a correction coefficient De corresponding to the current measure of the number of rotations No of the engine 12 from among a plurality of correction coefficients having the characteristic of becoming closer to a value "1" as the number of rotations No of the engine 12 increases and becoming closer to a value "0" as the number of rotations No of the engine 12 decreases.

Step ST108: The necessary acceleration $\alpha 0$ is corrected by being multiplied by the correction coefficient De obtained from the map in the above-mentioned manner, and the thus-corrected necessary acceleration $\alpha 0$ is set as new or corrected necessary acceleration $\alpha 0$.

Step ST109: The rotation of the transporting drive motors 25L and 25R is controlled to be accelerated in accordance with the corrected necessary acceleration $\alpha 0$, and then the control section 44 returns to step ST07 of FIG. 6. Namely, step ST109 is directed to controlling the rotation of the electric motors (transporting drive motors) 25L and 25R in accordance with the corrected necessary acceleration $\alpha 0$.

Figure 9:
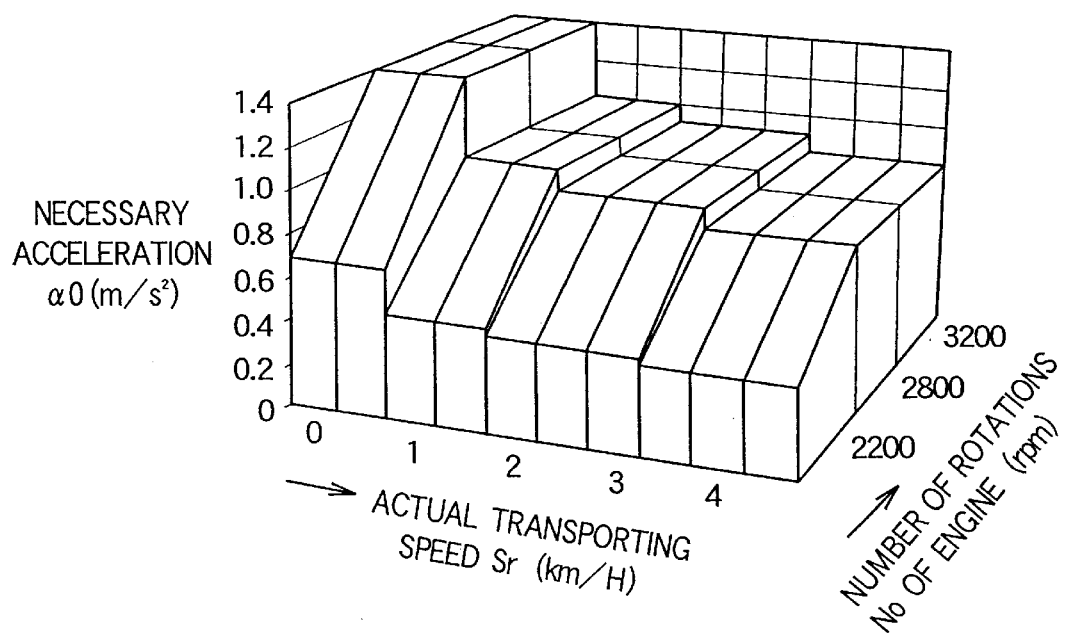
FIG. 9 is a corrected-acceleration map employed in the snow removing machine of the present invention.

FIG. 9 is a corrected-acceleration map employed in the instant embodiment, which collectively shows relationship among the number of rotations No (rpm) of the engine 12, actual transporting speed Sr (km/h) and necessary acceleration $\alpha 0$ (m/s$^2$) detected or set in the above-mentioned manner. From this corrected-acceleration map, it can been seen that, when the number of rotations No of the engine 12 is relatively great, the rotation of the electric motors 25L and 25R can be accelerated in accordance with a value close to the necessary acceleration $\alpha 0$ determined in correspondence with the actual transporting speed Sr of the transporting section. It can also be seen that the rotation of the electric motors 25L and 25R can be accelerated in accordance with the corrected necessary acceleration $\alpha 0a$ of a relatively small value when the number of rotations No of the engine 12 is relatively small. Therefore, the rotation of the electric motors 25L and 25R can be accelerated in accordance with optimum necessary acceleration $\alpha 0a$ corresponding to the number of rotations No of the engine 12.

Namely, in the first embodiment, the control section 44 performs the operations of: determining necessary acceleration $\alpha 0$ in accordance with a current actual transporting speed of the driving wheels 23L and 23R (steps ST101 to ST105 of FIG. 7); determining a correction coefficient De corresponding to the current measure of the number of rotations No of the engine 12 from among a plurality of correction coefficients having the characteristic of becoming closer to the value "1" as the number of rotations No of the engine 12 increases and becoming closer to the value "0" as the number of rotations No of the engine 12 decreases (step ST107 of FIG. 7); multiplying the necessary acceleration $\alpha 0$ by the determined correction coefficient De (step ST108 of FIG. 7); and controlling the rotation of the motors 25L and 25R in accordance with the corrected necessary acceleration (step ST109 of FIG. 7).

With the arrangements described above, even when the electric motors (transporting drive motors) 25L and 25R have been accelerated rapidly while the engine 12 is rotating at low speed, the acceleration of the motors 25L and 25R in the instant embodiment can be restricted to an optimal value corresponding to the number of rotations of the engine 12, and thus the amount of power generated by the generator (A.C. generator) 17 can also be restricted appropriately. Consequently, loads on the engine 12 can be lessened appropriately. Namely, in the instant embodiment, it is possible to increase the rotating speed of the motors 25L and 25R with the necessary acceleration while effectively preventing a rapid increase of the loads on the engine 12. By thus preventing a rapid increase of the loads on the engine 12, it is possible to avoid an undesired reduction in the number of rotations of the engine 12, thereby enhancing the operating efficiency of the working section (i.e., auger 13 and blower 14).

Figure 10:
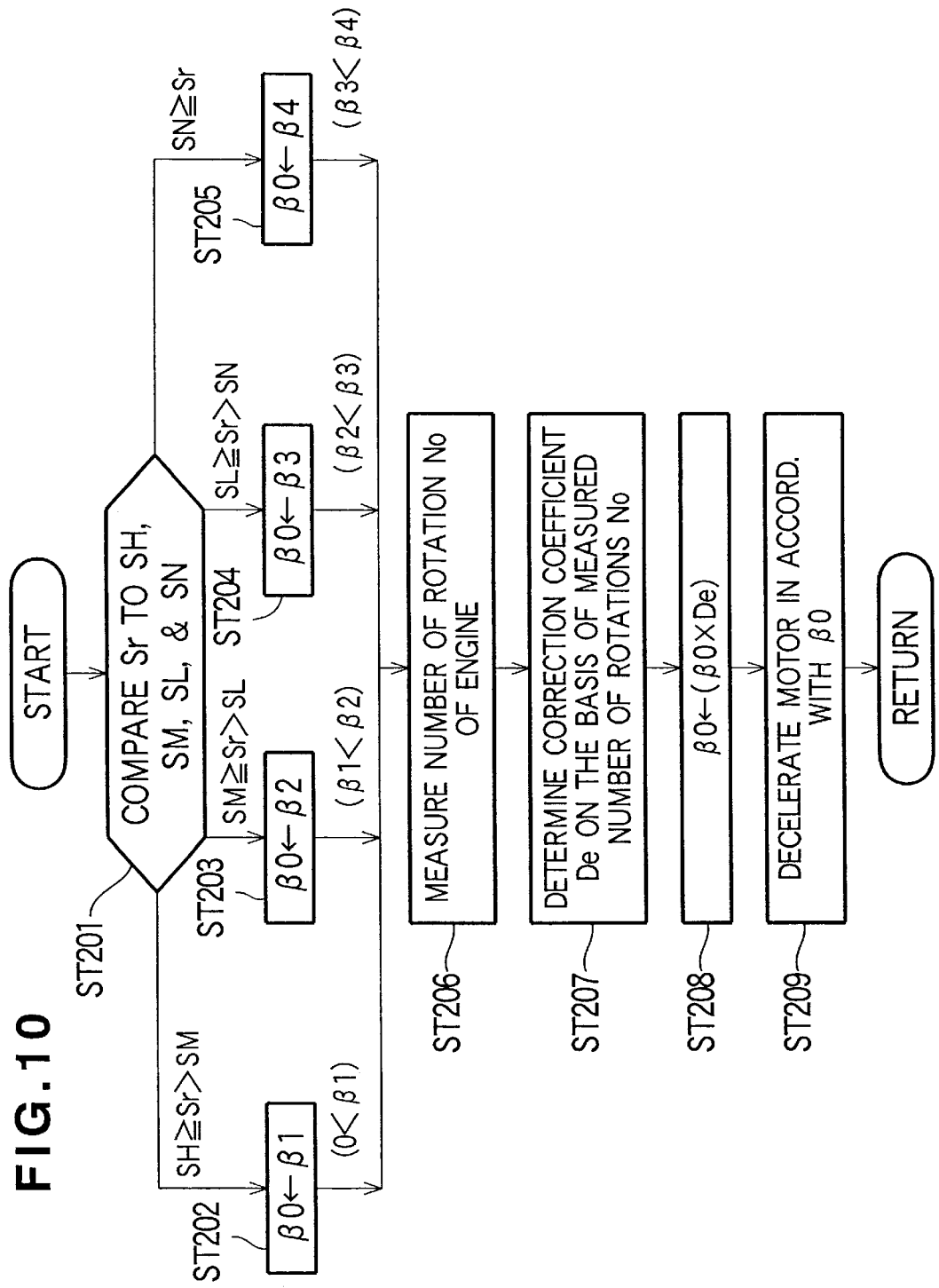
FIG. 10 is a flow chart showing decelerating control that is performed by the control section at step ST09 of FIG. 6.

FIG. 10 is a flowchart showing an exemplary step sequence of the decelerating control that is performed by the control section 44 at step ST09 of FIG. 6. Basically, this decelerating control subroutine is similar in contents to the accelerating control subroutine of FIG. 7, except that the decelerating control is intended to decelerate, rather than accelerate, the electric motors 25L and 25R and hence deceleration $\beta 0$ is used as a control factor in place of the acceleration $\alpha 0$. The steps in the decelerating control are carried out as follows.

Step ST201: The actual transporting speed Sr is compared to several predetermined speed-related threshold values, i.e. high-speed threshold value SH, medium-speed threshold value SM, low-speed threshold value SL and minute-speed threshold value SN. If the comparison result of step ST201 shows that the actual transporting speed Sr is higher than the medium-speed threshold value SM but not higher than the high-speed threshold value SH (i.e., SH≧Sr>SM), the control section 44 goes to step ST202. If SM≧Sr>SL), the control section 44 goes to step ST203. If SL≧Sr>SN, the control section 44 goes to step ST204. Further, if SN≧Sr, the control section 44 goes to step ST205.

Step ST202: First reference deceleration $\beta 1$ is set as deceleration $\beta 0$ necessary for the decelerating control (i.e., necessary deceleration $\beta 0$) of the electric motors 25L and 25R.

Step ST203: Second reference deceleration $\beta 2$ smaller than the first reference deceleration $\beta 1(\beta 1>\beta 2)$ is set as the necessary deceleration $\beta 0$.

Step ST204: Third reference deceleration $\beta 3$ smaller than the second reference deceleration $\beta 2(\beta 2>\beta 3)$ is set as the necessary deceleration $\beta 0$.

Step ST205: Fourth reference deceleration $\beta 4$ smaller than the third reference deceleration $\beta 3(\beta 3>\beta 4)$ is set as the necessary deceleration $\beta 0$.

Step ST206: The number of rotations No of the engine 12 is measured.

Step ST207: Correction coefficient De is determined on the basis of the measured number of rotations No of the engine 12. Specifically, the correction coefficient De is determined with reference to the map of FIG. 8 in a similar manner to step ST107 of FIG. 7.

Step ST208: The necessary deceleration $\beta 0$ is corrected by being multiplied by the correction coefficient De obtained from the map, and the thus-corrected necessary deceleration $\beta 0$ is set as new necessary deceleration $\beta 0$.

Step ST209: The rotation of the electric motors 25L and 25R is controlled to be decelerated in accordance with the corrected necessary deceleration $\beta 0$, and then the control section 44 returns to step ST09 of FIG. 6.

As apparent from the foregoing, the operations of steps ST201 to ST205 above are each directed to determining the necessary deceleration $\beta 0$ in accordance with the actual transporting speed Sr of the transporting section.

Generally speaking, even when the electric motors are decelerated excessively while the number of rotations of the engine is relatively small, the excessive deceleration would not directly lead to increased loads on the engine. However, with the excessive deceleration of the electric motors, the electromotive force (voltage) generated by the regenerative braking action of the electric motors would be increased considerably. Some effective measures have to be taken against excessive electromotive force applied to the battery, because the excessive electromotive force is undesirable for the battery and other electric components. Further, if the electromotive force generated by the regenerative braking action of the electric motors is excessive, it is conceivable that the electromotive force may cause the rotor of the power generator to rotate at much higher speed than the current speed. In such a case, the power generator would compulsorily rotate the output shaft of the engine, which is undesirable for the operation of the engine.

To avoid such inconveniences, the instant embodiment of the present invention is designed to perform the decelerating control of the electric motors 25L and 25R in accordance with the necessary deceleration $\beta 0$ appropriately corrected by being multiplied by the correction coefficient De, as set forth above.

Similarly to the necessary acceleration $\alpha 0$ described above in relation to FIG. 9, the necessary deceleration $\beta 0$ may be set to decrease as the actual transporting speed Sr becomes greater and decrease as the number of rotations of the engine 12 becomes smaller. The smaller necessary deceleration $\beta 0$ can reduce the electromotive force generated by the regenerative braking action of the electric motors 25L and 25R. By such arrangements, the electric motors 25L and 25R can be controlled to decelerate with optimal necessary deceleration $\beta 0$ that can effectively lessen the loads on the battery 43 and other electric components and is also more preferable for the operation of the engine 12.

Next, with reference to FIGS. 11 to 14, a detailed description will be given about a second embodiment of the present invention, which is generally similar to the above-described first embodiment in the hardware setup etc. but different from the first embodiment with respect to the control processing performed by the control section 44 of FIG. 4.

Figure 11:
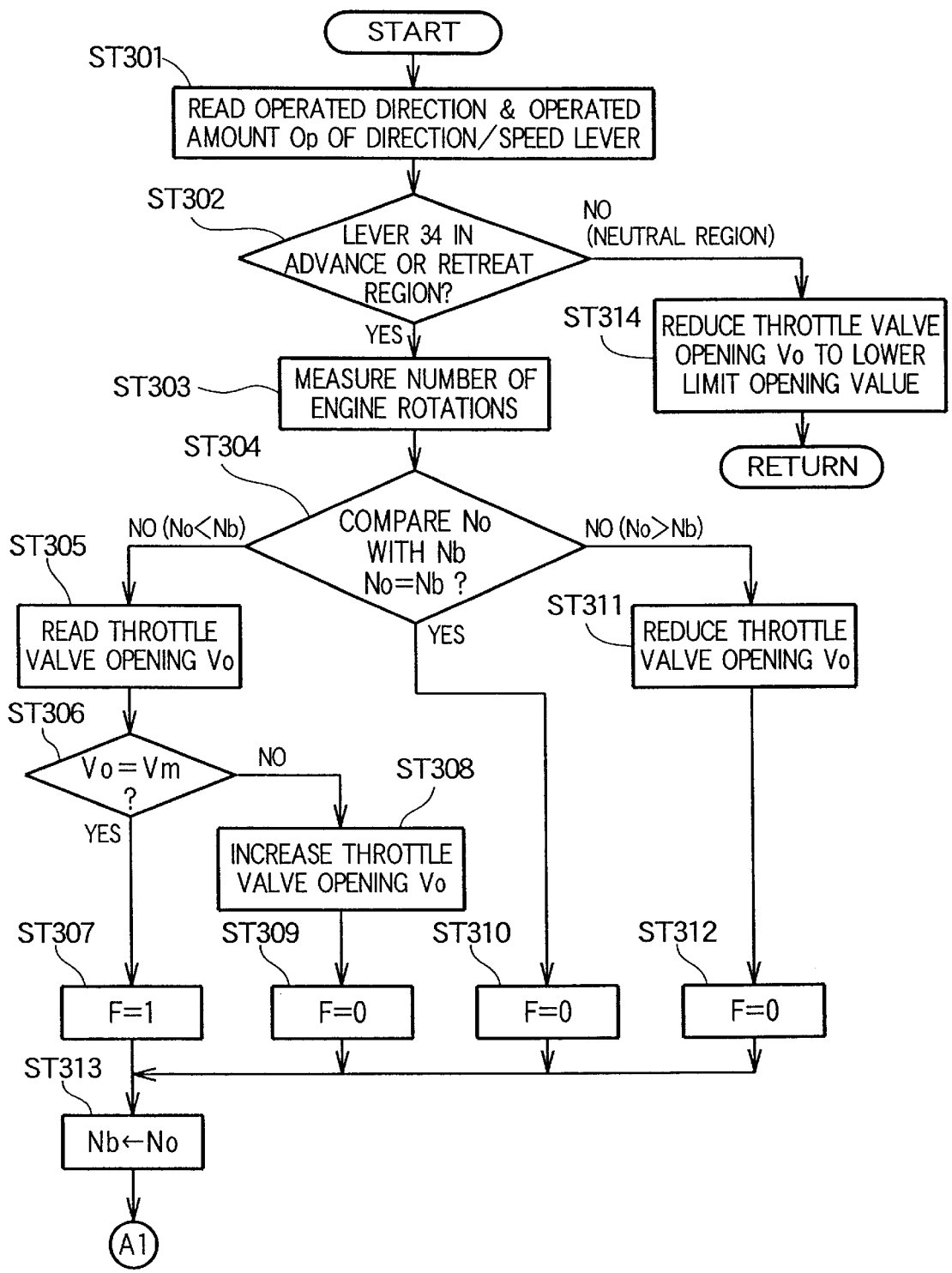
FIG. 11 is a flow chart showing a portion of engine/motor control processing performed by the control section in a second embodiment of the present invention.

Specifically, FIG. 11 is a flow chart showing a portion of engine/motor control processing performed in the second embodiment by the control section 44 of FIG. 4, which is started up, for example, in response to turning-on of the main switch 28. The steps in this portion of the engine/motor control processing are arranged as follows.

Step ST301: The control section 44 reads a current operated direction and amount Op of the direction/speed lever 34; note that the operated direction and amount Op are determined by a current position of the direction/speed lever 34, as described earlier in relation to the first embodiment.

Step ST302: It is determined whether or not the current position of the direction/speed lever 34 is currently in the advance or retreat region. With an affirmative (YES) determination, the control section 44 moves on to step ST303, while with a negative (NO) determination, the control section 44 judges that the direction/speed lever 34 is in the neutral region and thus branches to step ST314. Namely, an affirmative determination is made at step ST302 when the direction/speed lever 34 has been shifted from the neutral region (corresponding to a target transporting speed value of zero) to a desired speed-setting position in the advance or retreat region.

Step ST303: The current number of rotations No of the engine 12 is measured, for example, by the rotation sensor 56 of FIG. 4.

Step ST304: The thus-measured current number of rotations No of the engine 12 is compared with the number of rotations Nb of the engine 12 having been measured immediately before the current measurement (hereinafter called "last-measured number of rotations"). If the current number of rotations No is smaller than the last-measured number of rotations Nb, the control section 44 judges that the current opening of the throttle valve 48 is insufficient and thus branches to step ST305. If the current number of rotations No is equal to the last-measured number of rotations Nb, the control section 44 judges that there is no need to change the opening of the throttle valve 48 and goes to step ST310. Further, if the current number of rotations No is greater than the last-measured number of rotations Nb, the control section 44 judges the opening of the throttle valve 48 to be excessive and thus branches to step ST311.

Step ST305: The control section 44 reads the current opening Vo of the throttle valve 48 that may be detected by the throttle opening sensor 55 of FIG. 4.

Step ST306: It is determined whether the current opening Vo of the throttle valve 48 has reached an upper limit opening value Vm. If answered in the affirmative, the control section 44 proceeds to step ST307; otherwise, the control section 44 branches to step ST308.

Step ST307: Because the opening Vo of throttle valve 48 has reached the upper limit opening value Vm, a predetermined flag F is set to a value "1".

Step ST308: The opening Vo of throttle valve 48 is increased.

Step ST309: Because the opening Vo of throttle valve 48 has not yet reached the upper limit opening value Vm, the flag F is set to a value "0".

Step ST310: The flag F is set to the value "0".

Step ST311: The opening Vo of throttle valve 48 is reduced.

Step ST312: The flag F is set to the value "0".

Step ST313: The current number of rotations No of the engine 12 is set as a new value of the last-measured number of rotations Nb (i.e., the last-measured number of rotations Nb is updated with the current number of rotations No), and then the control section 44 proceeds to connector A1.

Step ST314: Since the direction/speed lever 34 is currently in the neutral region, the opening Vo of the throttle valve 48 is reduced to a lower limit, i.e., idling opening value, and the control section 44 reverts to step ST301.

Figure 12:
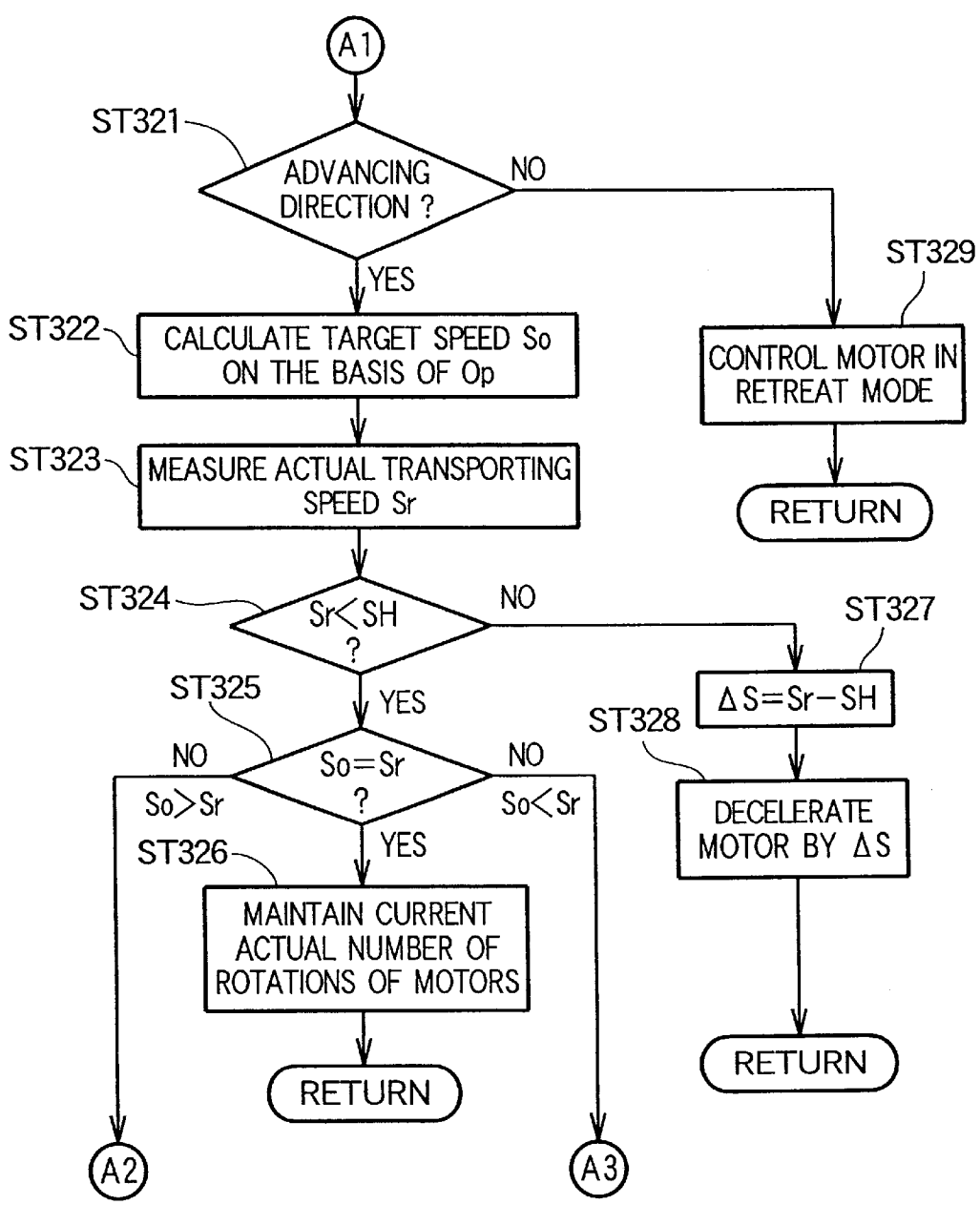
FIG. 12 is a flow chart showing another portion of the engine/motor control processing.

FIG. 12 is a flow chart showing another portion of the engine/motor control processing, which the control section 44 starts with step ST321 by way of connector A1. The steps in this portion of the engine/motor control processing are arranged as follows.

Step ST321: The control section 44 makes a determination as to whether or not the current operated direction of the direction/speed lever 34 is the advancing direction. With an affirmative (YES) determination, the control section 44 moves on to step ST322, where the left and right electric motors (transporting drive motors) 25L and 25R are subjected to advancing control in the predetermined advance mode. With a negative (NO) determination, on the other hand, the control section 44 branches to step ST329.

Step ST322: On the basis of the operated amount Op of the direction/speed lever 34, the control section 44 calculates a target speed So of the transporting section to be advanced. The target speed So is, for example, a target number of rotations of the electric motors 25L and 25R.

Step ST323: Current actual transporting speed Sr of the transporting section is measured; for example, the actual transporting speed Sr may be measured by measuring the actual number of rotations of the motors 25L and 25R via the rotation sensors 53L and 53R of FIG. 4.

Step ST324: Determination is made as to whether the actual transporting speed Sr is lower than the predetermined upper threshold value SH. If answered in the affirmative, the control section 44 proceeds to step ST325, but if answered in the negative, the control section 44 judges the actual transporting speed Sr to be excessive and branches to step ST327.

Step ST325: The actual transporting speed Sr is compared to the target speed So. If the actual transporting speed Sr is lower than the target speed So (So<Sr), the control section 44 judges the actual transporting speed Sr to be insufficient and goes to step ST401 of FIG. 8 by way of connector A2. If the actual transporting speed Sr is equal to the target speed So, the control section 44 judges that there is currently no need to change the vehicle's traveling state and thus moves on to step ST326. Further, if the actual transporting speed Sr is greater than the target speed So, the control section 44 judges the actual transporting speed Sr to be excessive and branches to step ST501 by way of connector A3.

Step ST326: Because there is no need to change the vehicle's traveling state, the control section 44 maintains the current actual number of rotations of the motors 25L and 25R and returns to step ST301.

Step ST327: Speed difference ΔS between the actual transporting speed Sr and the upper threshold value SH is calculated to determine an amount of the excess of the actual transporting speed Sr.

Step ST328: The electric motors 25L and 25R are decelerated by an amount corresponding to the thus-calculated speed difference ΔS so that their rotating speed is returned to the upper threshold value SH, and then the control section 44 returns to step ST301.

Step ST329: This step is taken when it has been determined at step ST321 that the current operated direction of the direction/speed lever 34 is the retreating direction. Here, the electric motors 25L and 25R are subjected to retreating control in the predetermined retreat mode. Note that this retreating control is substantially similar to the advancing control of steps ST322 to ST328 above and other steps to be later described in relation to FIGS. 13 and 14, except that the retreating control is intended to control backward travel, rather than forward travel, of the vehicle 10.

Figure 13:
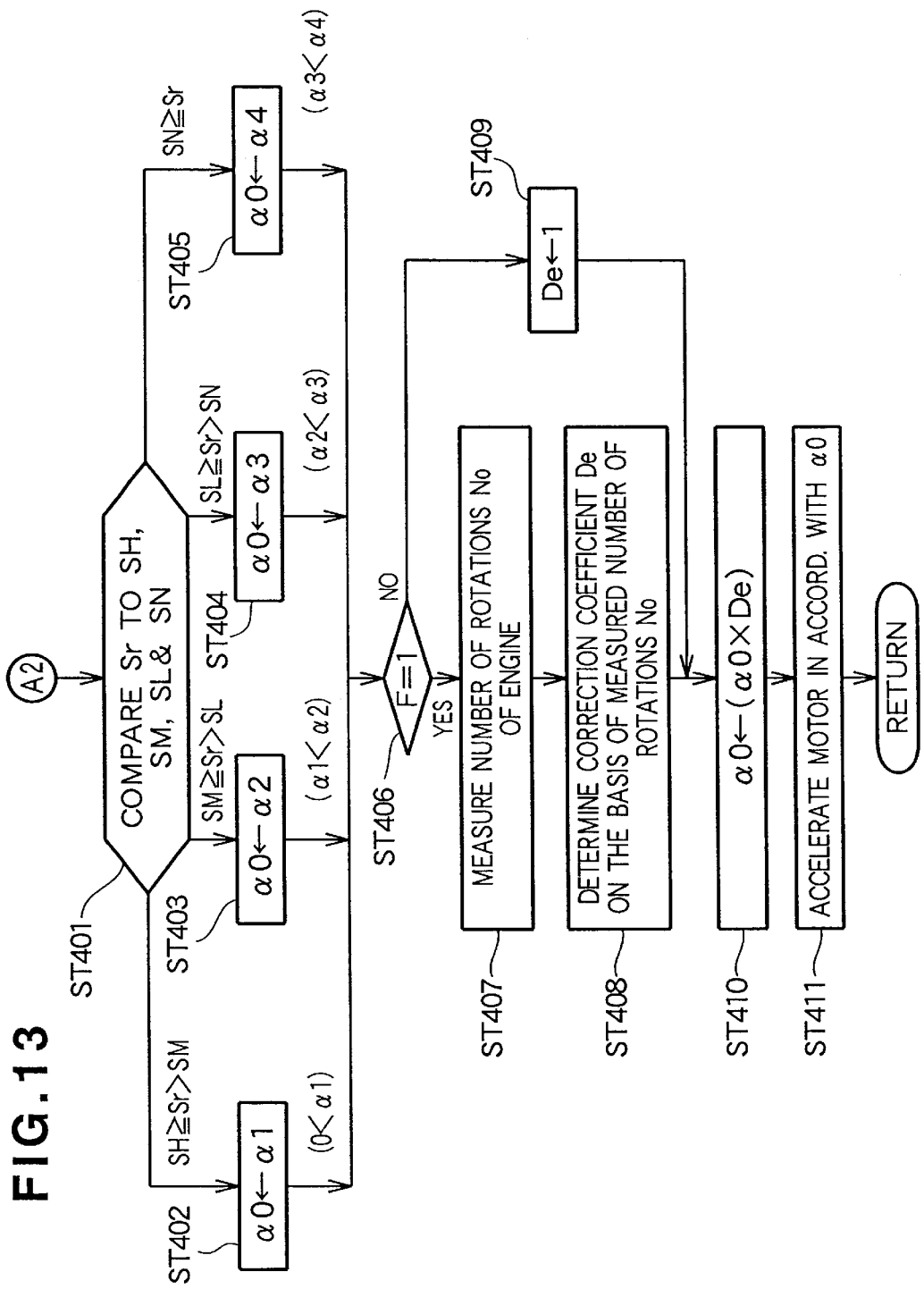
FIG. 13 is a flow chart showing still another portion of the engine/motor control processing.

FIG. 13 is a flow chart showing still another portion of the engine/motor control processing, which the control section 44 starts with step ST401 by way of connector A2. The steps in this portion of the engine/motor control processing are arranged as follows.

Step ST401: The actual transporting speed Sr is compared to several predetermined speed-related threshold values in just the same manner as described earlier in relation to the control processing in the first embodiment, i.e., step ST101 of FIG. 7. The speed-related threshold values are the high-speed (upper limit) threshold value SH, medium-speed threshold value SM, low-speed threshold value SL and minute-speed threshold value SN, which are, for example, 4.0 km/h, 3.0 km/h, 1.5 km/h and 0.5 km/h, respectively.

If the actual transporting speed Sr is higher than the medium-speed threshold value SM but not higher than the high-speed threshold value SH (SH≧Sr>SM), the control section 44 judges that the actual transporting speed Sr is in the high speed region and goes to step ST402. If the actual transporting speed Sr is higher than the low-speed threshold value SL but not higher than the medium-speed threshold value SM (SM≧Sr>SL), the control section 44 judges that the actual transporting speed Sr is in the medium speed region and goes to step ST403. If the actual transporting speed Sr is higher than the minute-speed threshold value SN but not higher than the low-speed threshold value SL (SL≧Sr>SN), the control section 44 judges that the actual transporting speed Sr is in the low speed region and goes to step ST404. Further, if the actual transporting speed Sr is equal to or lower than the minute-speed threshold value SN (SN≧Sr), the control section 44 judges that the actual transporting speed Sr is in the minute speed region and goes to step ST405.

At step ST402, ST403, ST404 and ST405, the same operations as at steps ST102, ST103, ST104 and ST105 of FIG. 7, described above in relation to the first embodiment, are carried out to set acceleration α0 necessary for the accelerating control (i.e., necessary acceleration α0) of the transporting drive motors 25L and 25R.

As apparent from the foregoing, the operations of steps ST401 to ST405 are each directed to determining the necessary acceleration α0 in accordance with the actual transporting speed Sr of the transporting section.

Step ST406: Determination is made as to whether the flag F is currently set at the value "1". If answered in the affirmative, this means that the opening of the throttle valve 48 has reached the upper limit opening value, and thus the control section 44 proceeds to step ST407. If, on the other hand, answered in the negative, this means that the opening of the throttle valve 48 has not yet reached the upper limit opening value, and thus the control section 44 branches to step ST409.

At steps ST407 and ST408, the same operations as at steps ST106 and ST107 of FIG. 7, described above in relation to the first embodiment, are carried out. Specifically, at step ST408, the above-described map of FIG. 8 is used to determine a correction coefficient De on the basis of the number of rotations No of the engine 12 measured at step ST407.

As clear from the foregoing, step ST408 of FIG. 13 is directed to obtaining a correction coefficient De corresponding to the current measure of the number of rotations No of the engine 12 from among a plurality of correction coefficients having the characteristic of becoming closer to a value "1" as the number of rotations No of the engine 12 increases and becoming closer to a value "0" as the number of rotations No of the engine 12 decreases.

Step ST409: Because the opening of the throttle valve 48 has not yet reached the upper limit opening value, the value "1" is set as the correction coefficient De in accordance with the map.

Step ST410: The necessary acceleration α0 is corrected by being multiplied by the correction coefficient De obtained from the map, and the thus-corrected necessary acceleration α0 is set as new or corrected necessary acceleration α0.

Step ST411: The rotation of the electric motors 25L and 25R is controlled to accelerate in accordance with the corrected necessary acceleration α0, and then the control section 44 returns to step ST301 of FIG. 11. Namely, step ST411 is directed to controlling the rotation of the electric motors (transporting drive motors) 25L and 25R in accordance with the corrected necessary acceleration α0.

The engine/motor control processing performed in the second embodiment also uses the corrected-acceleration map of FIG. 9, which collectively shows relationship among the number of rotations No (rpm) of the engine 12, actual transporting speed Sr (km/h) and necessary acceleration α0 (m/s$^2$) detected or set in the above-mentioned manner. From this corrected-acceleration map, it can been seen that, when the number of rotations No of the engine 12 is relatively great with the throttle valve opening having reached the upper limit opening value, the rotation of the electric motors 25L and 25R can be accelerated in accordance with a value close to the necessary acceleration α0 determined in correspondence with the actual transporting speed Sr of the transporting section. It can also be seen that the rotation of the electric motors 25L and 25R can be accelerated in accordance with a small value of corrected necessary acceleration α0 when the number of rotations No of the engine 12 is relatively small. Therefore, the rotation of the transporting drive motors 25L and 25R can be accelerated in accordance with optimum necessary acceleration α0a corresponding to the number of rotations No of the engine 12.

Namely, the second embodiment is characterized in that, when the necessary amount of electric power generated by the power generator 17 has increased due to a variation in the number of rotations of the motors 25L and 25R in response to a variation in the target transporting speed, the control section 44 controls the opening of the throttle valve 48 to secure the necessary number of rotations in order to secure the necessary amount of electric power.

When the number of rotations of the electric motors 25L and 25R is to be increased, more electric power is required, so that the amount of electric power to be generated by the power generator 17 has to be increased. To secure the required electric power, it is necessary to acquire more than a predetermined number of rotations of the engine 12. For this purpose, the second embodiment is arranged to automatically control the opening of the throttle valve 48 by means of the control section 44. With such an arrangement, the second embodiment can readily maintain the necessary number of rotations of the engine 12, and eliminate the need for manipulating the engine throttle lever 35 each time the electric motors 25L and 25R are to be accelerated or decelerated by manipulation of the direction/speed lever 34. As a consequence, the operability of the working machine 10 can be enhanced to a significant degree.

Further, when the number of rotations of the electric motors 25L and 25R is reduced and thus the power generator 17 only has to generate a less amount of electric power, the load on the engine 12 can be lessened accordingly, so that the engine 12 does not have to operate at high speed. Therefore, the control section 44 automatically reduces the opening of the throttle valve 48. Because, in this case, the engine 12 does not have to continue operating at high speed unnecessarily, it is possible to save the fuel and prolong the life of the engine 12. In addition, the embodiment can effectively prevent the number of rotations of the engine 12 from being undesirably reduced due to a great load imposed thereon when a great amount of electric power has to be secured, with the result that the operating efficiency of the working machine 10 can be enhanced.

The second embodiment is also characterized in that the control section 44 performs the operations of: determining necessary acceleration α0 in accordance with the actual transporting speed of the driving wheels 23L and 23R (steps ST401 to ST405 of FIG. 13); when the opening of the throttle valve 48 has reached the upper limit opening value, determining a correction coefficient De corresponding to the current measure of the number of rotations No of the engine 12 from among the correction coefficients having the characteristic of becoming closer to the value "1" as the number of rotations No of the engine 12 increases and becoming closer to the value "0" as the number of rotations No of the engine 12 decreases (steps ST406 to ST408 of FIG. 13); when the opening of the throttle valve 48 has not yet reached the upper limit opening value, setting the correction coefficient De at "1" (steps ST406 and ST409 of FIG. 13); multiplying the necessary acceleration α0 by the determined correction coefficient De (step ST410 of FIG. 13); and controlling the rotation of the motors 25L and 25R in accordance with the corrected necessary acceleration (step ST411 of FIG. 13).

When the number of rotations of the electric motors 25L and 25 has increased, the control section 44 automatically increases the opening of the throttle valve 48 as long as the engine 12 still has sufficient room or capacity to produce higher outputs, in order to supply necessary electric power corresponding to the increase in the number of rotations. As a consequence, the rotation of the transporting drive motors 25L and 25 can be accelerated in accordance with a value close to the necessary acceleration determined in correspondence with the actual transporting speed of the transporting section. When the opening of the throttle valve 48 has reached the upper limit opening value and the engine 12 no longer has sufficient room or capacity to produce higher outputs, the rotation of the electric motors 25L and 25 is accelerated in accordance with the corrected necessary acceleration of a relatively small value.

Thus, even when the electric motors (transporting drive motors) 25L and 25R have been accelerated rapidly, the acceleration of the motors 25L and 25R in the instant embodiment can be restricted to an optimal value corresponding to the number of rotations of the engine 12, and thus the amount of power generated by the electric power generator (A.C. generator) 17 can also be restricted appropriately. Consequently, the loads on the engine 12 can be lessened appropriately. Namely, in the instant embodiment, it is possible to increase the rotating speed of the motors 25L and 25R with the necessary acceleration while effectively preventing a rapid increase of the loads on the engine 12. By thus preventing a rapid increase of the loads on the engine 12, it is possible to avoid an undesired reduction in the number of rotations of the engine 12, thereby enhancing the operating efficiency of the working section (i.e., auger 13 and blower 14).

Finally, FIG. 14 is a flow chart showing still another portion of the engine/motor control processing, which the control section 44 starts with step ST501 by way of connector A3. Note that this control flow of FIG. 14 is for decelerating control and substantially similar to the accelerating control flow of FIG. 13, except that the retreating control flow is intended to control backward travel, rather than forward travel, of the vehicle 10 and hence controls deceleration β0 is controlled in stead of the acceleration α0. The steps in this portion of the engine/motor control processing are arranged as follows.

Step ST501: The actual transporting speed Sr is compared to several predetermined speed-related threshold values in just the same manner as described earlier in relation to the control processing in the first embodiment, i.e., step ST201 of FIG. 10. If the actual transporting speed Sr is higher than the medium-speed threshold value SM but not higher than the high-speed threshold value SH (SH≧Sr>SM), the control section 44 goes to step ST502. If the actual transporting speed Sr is higher than the low-speed threshold value SL but not higher than the medium-speed threshold value SM (SM≧Sr>SL), the control section 44 goes to step ST503. If the actual transporting speed Sr is higher than the minute-speed threshold value SN but not higher than the low-speed threshold value SL (SL≧Sr>SN), the control section 44 goes to step ST504. Further, if the actual transporting speed Sr is equal to or lower than the minute-speed threshold value SN (SN≧Sr), the control section 44 goes to step ST505.

At step ST502, ST503, ST504 and ST505, the same operations as at steps ST202, ST203, ST204 and ST205 of FIG. 10, described above in relation to the first embodiment, are carried out to set deceleration β0 necessary for the decelerating control (i.e., necessary deceleration β0) of the electric motors 25L and 25R.

Step ST506: Determination is made as to whether the flag F is currently set at the value "1". If answered in the affirmative, this means that the opening of the throttle valve 48 has reached the upper limit opening value, and thus the control section 44 proceeds to step ST507. If, on the other hand, answered in the negative, this means that the opening of the throttle valve 48 has not yet reached the upper limit opening value, and thus the control section 44 branches to step ST509.

At steps ST507 and ST508, the same operations as at steps ST206 and ST207 of FIG. 10 described above in relation to the first embodiment or as at steps ST407 or ST408 of FIG. 13, are carried out.

Step ST509: Since the opening of the throttle valve 48 has not yet reached the upper limit opening value, the value "1" is set as the correction coefficient De in accordance with the map of FIG. 8.

Step ST510: The necessary deceleration β0 is corrected by being multiplied by the correction coefficient De obtained from the map, and the thus-corrected necessary deceleration β0 is set as new or corrected necessary deceleration β0.

Step ST511: The rotation of the electric motors 25L and 25R is controlled to decelerate in accordance with the corrected necessary deceleration β0, and then the control section 44 returns to step ST301 of FIG. 11.

As apparent from the foregoing, the operations of steps ST501 to ST505 above are each directed to determining necessary deceleration β0 in accordance with the actual transporting speed Sr of the transporting section. When the opening of the throttle valve 48 has reached the upper limit opening value, step ST508 determines a correction coefficient De corresponding to the current measure of the number of rotations No of the engine 12 from among the correction coefficients having the characteristic of becoming closer to the value "1" as the number of rotations No of the engine 12 increases and becoming closer to the value "0" as the number of rotations No of the engine 12 decreases. When the opening of the throttle valve 48 has not yet reached the upper limit opening value, step ST509 sets the correction coefficient De at "1". Step ST510 multiplies the necessary deceleration β0 by the determined correction coefficient De, and step ST511 controls the rotation of the transporting drive motors 25L and 25R in accordance with the corrected necessary deceleration β0.

For the same reasons described above in relation to the decelerating control in the first embodiment, the second embodiment can control the electric motors 25L and 25R to decelerate with optimal necessary deceleration β0 that can effectively lessen the loads on the battery 43 and other electric components and is also more preferable for the operation of the engine 12.

Note that the direction/speed lever 34 in the embodiment may be in the form of any desired operating member as along as it can be used to set a target transporting speed of the transporting section to a desired value from a zero speed.

It should also be appreciated that the present invention may be embodied as any desired type of working machine other than the above-described snow removing machine 10, such as a lawn mower or plant cutting machine. In the case where the present invention is embodied as a lawn mower, a mowing cutter driven by the engine constitutes the working section.

In summary, the working machine of the present invention is characterized in that the control section determines necessary acceleration of the transporting section in accordance with a current actual transporting speed of the transporting section, determines a correction coefficient corresponding to a current number of rotations of the engine, from among correction coefficients having a characteristic of becoming closer to a value of one as the number of rotations of the engine increases but becoming closer to zero as the number of rotations of the engine decreases, multiplies the necessary acceleration by the determined correction coefficient to thereby correct the necessary acceleration, and controls the rotation of the electric motors in accordance with the corrected necessary acceleration. Thus, when the number of rotations of the engine is relatively great, the rotation of the electric motors can be accelerated in accordance with a value close to the necessary acceleration having been determined in accordance with the current actual transporting speed of the transporting section, while when the number of engine rotations is relatively small, the rotation of the electric motors can be accelerated in accordance with the corrected necessary acceleration having a relatively small value. Therefore, in the present invention, the rotation of the electric motors can be accelerated with optimum necessary acceleration corresponding to the number of rotations of the engine. Even when the electric motors have been accelerated rapidly while the engine is rotating at low speed, the acceleration of the motors in the present invention can be restricted to an optimal value corresponding to the number of rotations of the engine, and thus the amount of power generated by the power generator can also be restricted appropriately. Consequently, the loads on the engine can be lessened appropriately. Namely, in the present invention, it is possible to increase the rotating speed of the electric motors with the necessary acceleration while effectively preventing a rapid increase of the loads on the engine. By thus preventing a rapid increase of the loads on the engine, an undesired reduction in the number of rotations of the engine can be avoided, so that the operating efficiency of the working section can be enhanced significantly. Further, by preventing a rapid increase of the loads on the engine, the present invention can improve exhausting performance to allow exhaust to be discharged smoothly from the engine, can reduce noise due to engine knock etc., and can improve fuel consumption.

Further, the present invention is characterized in that, when the amount of electric power to be generated by the electric power generator has increased in response to an increase in the necessary number of rotations of the electric motor, the control section automatically controls the opening of the throttle valve, in order to secure the necessary number of rotations of the engine for securing the amount of electric power to be generated. Thus, the present invention can readily maintain the necessary number of rotations of the engine, and eliminate the need for manipulating the engine throttle lever each time the electric motor is to be accelerated or decelerated by manipulation of the speed lever. As a result, the operability of the working machine of the invention can be enhanced to a significant degree. Further, when the number of rotations of the electric motor is reduced and thus the power generator only has to generate a less amount of electric power, the load on the engine can be lessened accordingly, so that the engine does not have to operate at high speed. Therefore, the control section in the present invention automatically reduces the opening of the throttle valve. In addition, because the engine does not have to continue operating at high speed unnecessarily, it is possible to not only save the fuel and but also prolong the life of the engine. Furthermore, the present invention can effectively prevent the number of rotations of the engine from being undesirably reduced due to a great load imposed on the engine when a great amount of electric power has to be secured, which can advantageously secure enhanced operating efficiency of the working machine.

The present disclosure relates to the subject matters of Japanese Patent Application Nos. 2001-333213 and 2001-362640, respectively filed Oct. 30, 2001 and Nov. 28, 2001, the disclosures of which are expressly incorporated herein by reference in their entireties.

What is claimed is:

1. A working machine comprising:
   a driving section including an engine, an electric power generator driven by said engine, a battery chargeable by said electric power generator, and an electric motor drivable by both of said electric power generator and said battery;
   a working section driven by said engine to perform desired work;
   a transporting section driven by said electric motor; and
   a control section for controlling rotation of said electric motor, on the basis of a comparison between an actual transporting speed and a target transporting speed of said transporting section and,
   said control section performing the operations of:
      determining necessary acceleration of said transporting section in accordance with the actual transporting speed of said transporting section;
      determining a correction coefficient corresponding to a current number of rotations of said engine, from among correction coefficients having a characteristic of becoming closer to a value of one as the number of rotations of said engine increases but becoming closer to zero as the number of rotations of said engine decreases;
      multiplying the necessary acceleration by the determined correction coefficient, to thereby provide corrected necessary acceleration; and
      controlling the rotation of said electric motor in accordance with the corrected necessary acceleration.

2. A working machine comprising:
   a driving section including an electric motor, an electric power generator, and an engine having a throttle valve associated therewith;
   a transporting section driven by said electric motor and including a speed lever for setting a target transporting speed of said transporting section to a desired speed value, part or whole of electric power necessary for said electric motor being supplied by said electric power generator;
   a working section driven by said engine to perform desired work, said electric power generator being driven by said engine; and
   a control section for controlling rotation of said electric motor so that an actual transporting speed of said transporting section equals the target transporting speed,
   wherein when an amount of electric power to be generated by said electric power generator has increased in response to a variation in a necessary number of rotations of said electric motor corresponding to a variation in the target transporting speed, said control section controls an opening of said throttle valve, in order to secure a necessary number of rotations of said engine for securing the amount of electric power to be generated.

3. A working machine as claimed in claim 2 wherein said control section performs the operations of:

determining necessary acceleration in accordance with the actual transporting speed of said transporting section;

when the opening of said throttle valve has reached a predetermined upper limit opening value, determining a correction coefficient corresponding to a current number of rotations of said engine from among correction coefficients having a characteristic of becoming closer to a value of one as the number of rotations of said engine increases and becoming closer to zero as the number of rotations of said engine decreases;

when the opening of said throttle valve has not yet reached the upper limit opening value, setting the correction coefficient at the value of one;

multiplying the necessary acceleration by the correction coefficient, to thereby provide corrected necessary acceleration; and controlling the rotation of said electric motor in accordance with the corrected necessary acceleration.

* * * * *